United States Patent
Kurosawa et al.

[11] Patent Number: 5,914,538
[45] Date of Patent: *Jun. 22, 1999

[54] COMMUNICATION APPARATUS AND POWER SUPPLY DEVICE THEREFOR

[75] Inventors: Yuji Kurosawa, Tokyo; Koichi Abe, Tanashi, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/231,848

[22] Filed: Apr. 25, 1994

[30] Foreign Application Priority Data

| Apr. 27, 1993 | [JP] | Japan | 5-101108 |
| Sep. 16, 1993 | [JP] | Japan | 5-230259 |
| Sep. 16, 1993 | [JP] | Japan | 5-230260 |
| Oct. 18, 1993 | [JP] | Japan | 5-259987 |

[51] Int. Cl.$^6$ ............................................ H02J 7/00
[52] U.S. Cl. .................... 307/18; 307/66; 307/141; 379/100.01; 358/406; 358/468
[58] Field of Search .................. 307/64, 65, 66, 307/18, 85, 86, 67, 132 R, 141, 141.4, 38, 39, 44, 125, 130, 131; 379/102, 105; 320/6, 15, 37, 38, 58; 364/707; 358/406, 434, 442, 468

[56] References Cited

U.S. PATENT DOCUMENTS

| 4,642,479 | 2/1987 | Lombardi et al. | 307/141 |
| 4,723,269 | 2/1988 | Summerlin | 379/102 |
| 4,794,272 | 12/1988 | Bavaro et al. | 307/66 |
| 5,081,411 | 1/1992 | Walker | 323/326 |
| 5,146,489 | 9/1992 | Telibasa | 379/100 |
| 5,157,271 | 10/1992 | Fujiwara | 307/66 |
| 5,198,698 | 3/1993 | Paul et al. | 307/64 |
| 5,282,054 | 1/1994 | Oana et al. | 358/406 |
| 5,363,312 | 11/1994 | Ninomiya | 364/483 |
| 5,383,140 | 1/1995 | Nanno et al. | 364/707 |
| 5,449,238 | 9/1995 | Pham et al. | 400/54 |

FOREIGN PATENT DOCUMENTS

| A-347713 | 12/1989 | European Pat. Off. . |
| A-358441 | 3/1990 | European Pat. Off. . |
| A-514072 | 11/1992 | European Pat. Off. . |
| 1-122256 | 5/1989 | Japan . |
| 1-318350 | 12/1989 | Japan . |
| 3-185961 | 8/1991 | Japan . |
| 5-22480 | 1/1993 | Japan . |
| A2231213 | 11/1990 | United Kingdom . |
| WO-A9320647 | 10/1993 | WIPO . |

OTHER PUBLICATIONS

Patent Abstracts Of Japan, vol. 6 No. 77 (E–106), May 14, 1982 and JP–A–57 013851 (Mitsubishi Electric), Jan. 23, 1982.
Patent Abstracts Of Japan, vol. 13, No. 366 (E–806), Aug. 15, 1989 and JP–A–01 122256 (NEC), May 15, 1989.
Patent Abstracts Of Japan, vol.14, No. 125 (E–900), Mar. 8, 1990 and JP–A–01 318350 (Canon), Dec. 22, 1989.
Patent Abstracts Of Japan, vol. 15, No. 442 (E–1131), Nov. 11, 1991 and JP–A–03 185961 (Fujitsu), Aug. 13, 1991.
Patent Abstracts Of Japan, vol. 17, No. 301 (E–1378), Jun. 10, 1993 and JP–A–05 022480 (Toshiba), Jan. 29, 1993.

*Primary Examiner*—Jeffrey Gaffin
*Assistant Examiner*—Jonathan S. Kapla
*Attorney, Agent, or Firm*—Fitzpatrick Cella Harper & Scinto

[57] ABSTRACT

A power supply device for a communication apparatus includes a main power supply for supplying electric power to respective units of a communication apparatus main body, a main power supply control unit for ON/OFF-controlling the main power supply, and a battery for supplying electric power to the main power supply control unit. When the main power supply is ON, the main power supply control unit receives power supply from the main power supply. When the main power supply is OFF, the main power supply control unit receives power supply from the battery.

13 Claims, 30 Drawing Sheets

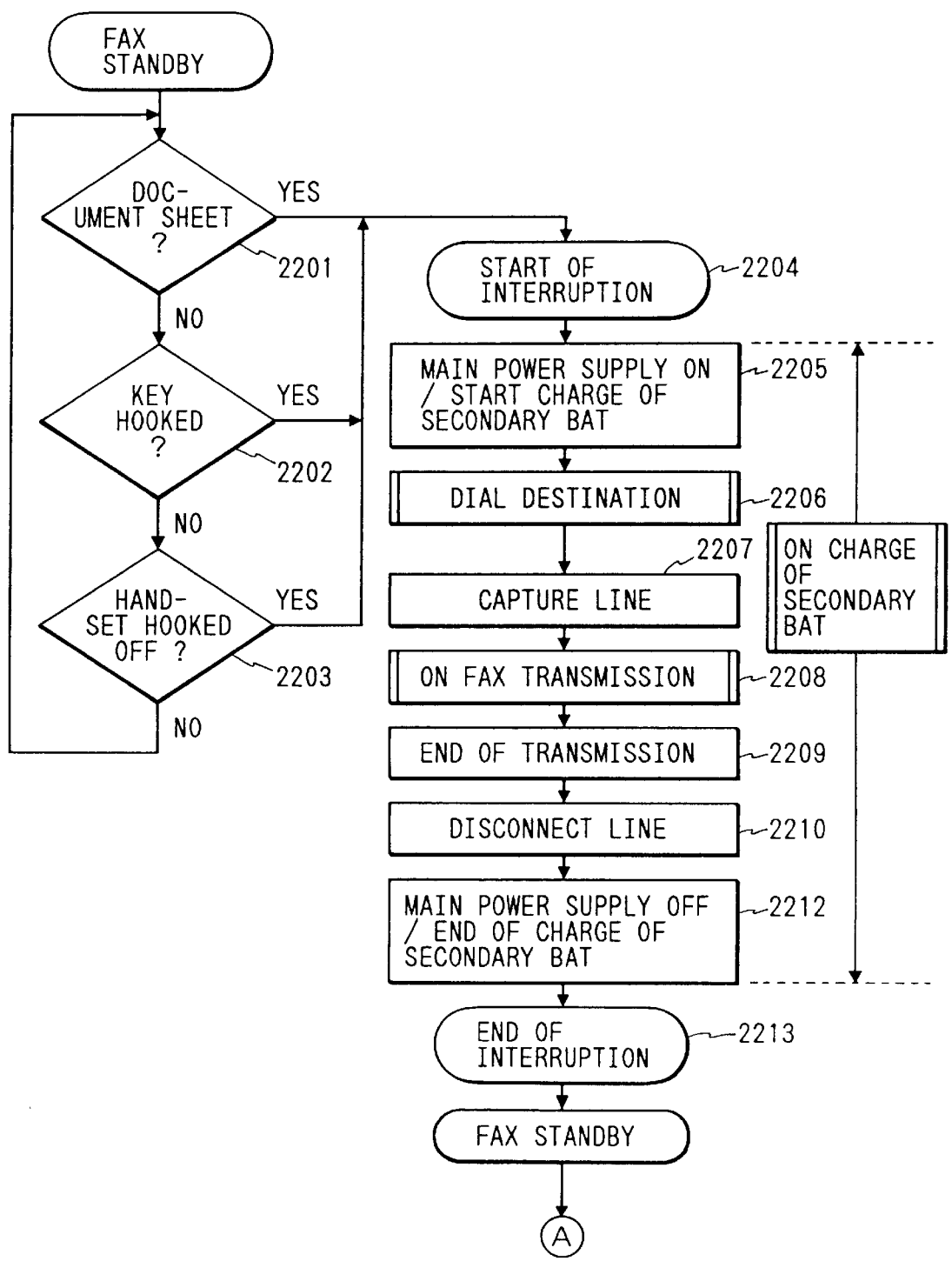

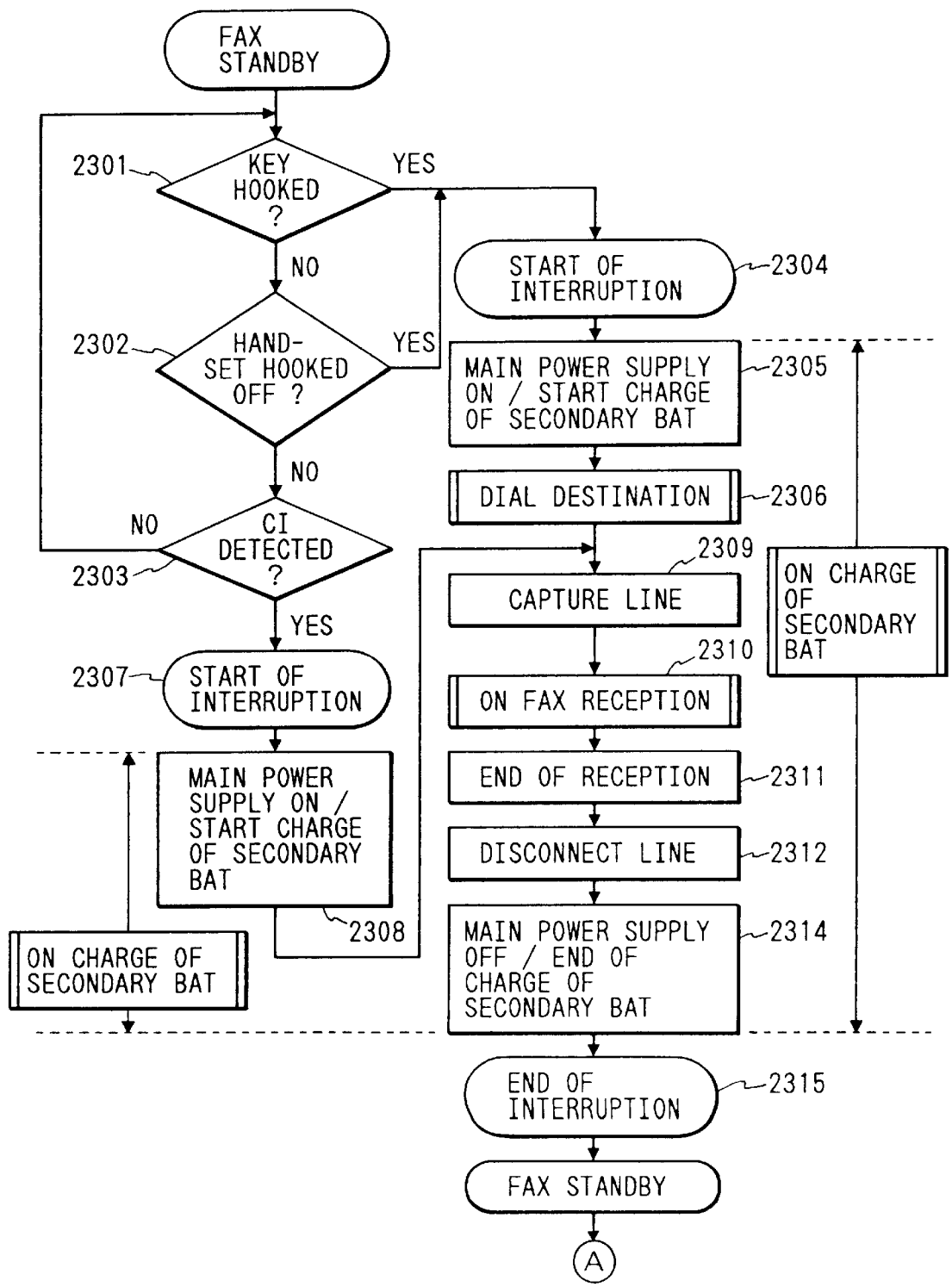

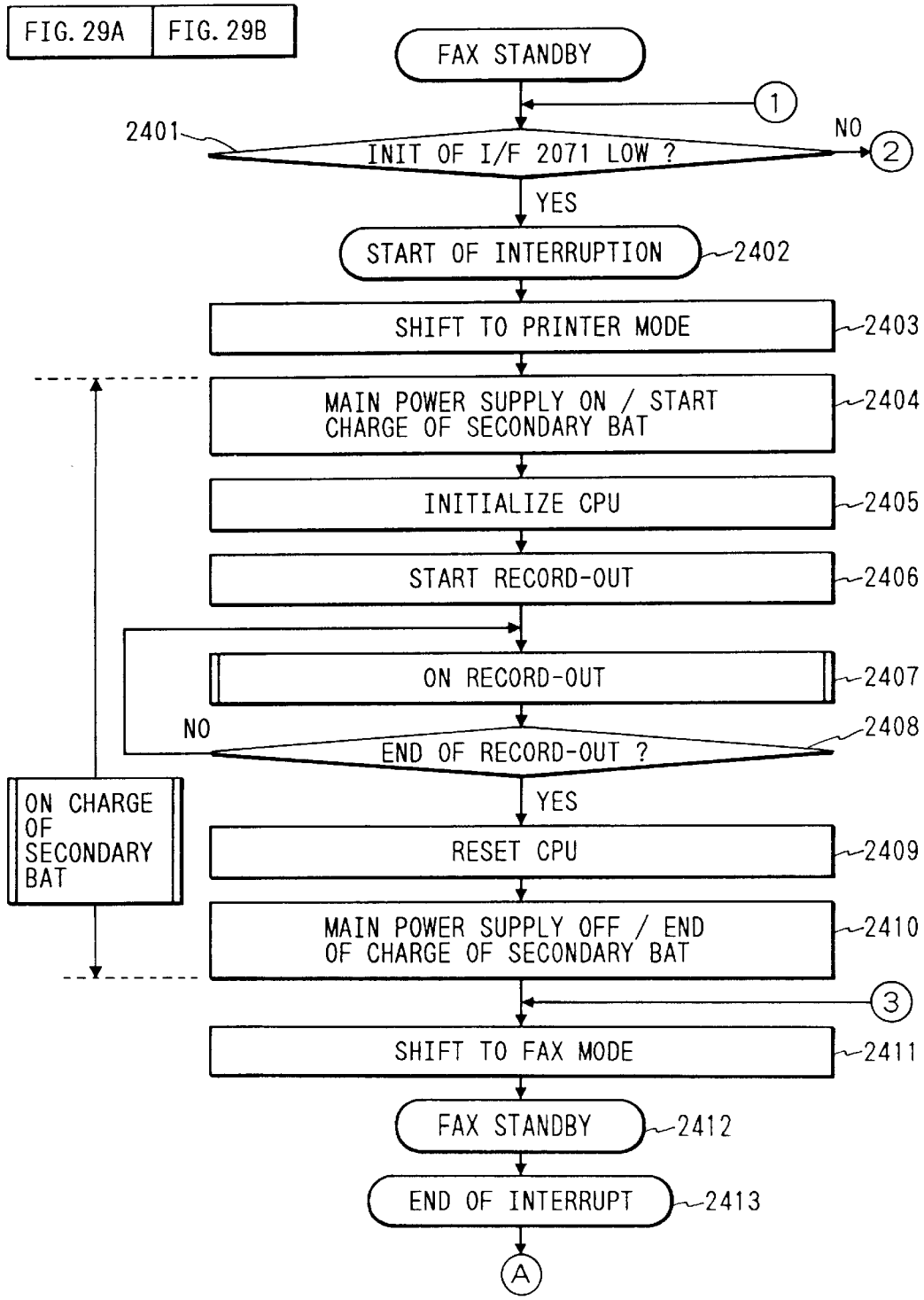

COMMUNICATION APPARATUS AND POWER SUPPLY DEVICE THEREFOR

BACKGROUND OF THE INVENTION

1. Field of the Invention

The present invention relates to a facsimile apparatus having an auto-receive function. The present invention also relates to an externally controllable switching power supply device and, more particularly, to a power supply device suitable for, e.g., a facsimile apparatus having a standby state.

2. Related Background Art

Conventionally, an apparatus having a standby state such as a facsimile apparatus generally adopts a switching power supply or the like as its power supply. In a standby state or during operation, the switching power supply is always enabled. Also, another apparatus has a sub power supply for a standby state in addition to a main power supply. In an apparatus of this type, only the sub power supply is enabled in the standby state, and the main power supply is enabled during only an operation, thus achieving low power consumption.

In addition, the primary side of the main power supply is directly controlled by a ringing signal from a telephone line, thus attaining power saving.

However, in an apparatus in which the primary side of the main power supply oscillates to supply some power (electric power) to its secondary side like in the above-mentioned conventional facsimile apparatus, electric power of about 10 W is consumed in a standby state, and is consumed all day long for an auto-receive function, resulting in a very large electric power loss. In addition, the power supply generates radiation noise, and adversely influences other electronic devices.

Severe limitations associated with safety standards are imposed on direct control of the primary side of the main power supply using a plurality of means, and it is difficult to attain such control in practice.

A facsimile apparatus which has a printer function as its additional function has also been developed.

In such an apparatus, as for the printer function as the additional function, since switching control between a facsimile mode and a printer mode is executed by a central control unit of the facsimile apparatus, the main power supply must be enabled upon execution of mode switching control. For this reason, the main power supply must always be enabled.

SUMMARY OF THE INVENTION

It is an object of the present invention to improve a communication apparatus.

It is another object of the present invention to improve a power supply device of a communication apparatus.

It is still another object of the present invention to provide a power supply device for a communication apparatus, which can attain power consumption of almost 0 W in a standby state, and is free from generation of radiation noise and problems associated with safety standards.

BRIEF DESCRIPTION OF THE DRAWINGS

FIG. 27 is a flow chart showing a FAX transmission interruption routine in the FAX standby state;

FIG. 28 is a flow chart showing a FAX reception interruption routine in the FAX standby state.

DETAILED DESCRIPTION OF THE PREFERRED EMBODIMENTS (First Embodiment)

The present invention will be described in detail below with reference to illustrated embodiments.

Figure 1:
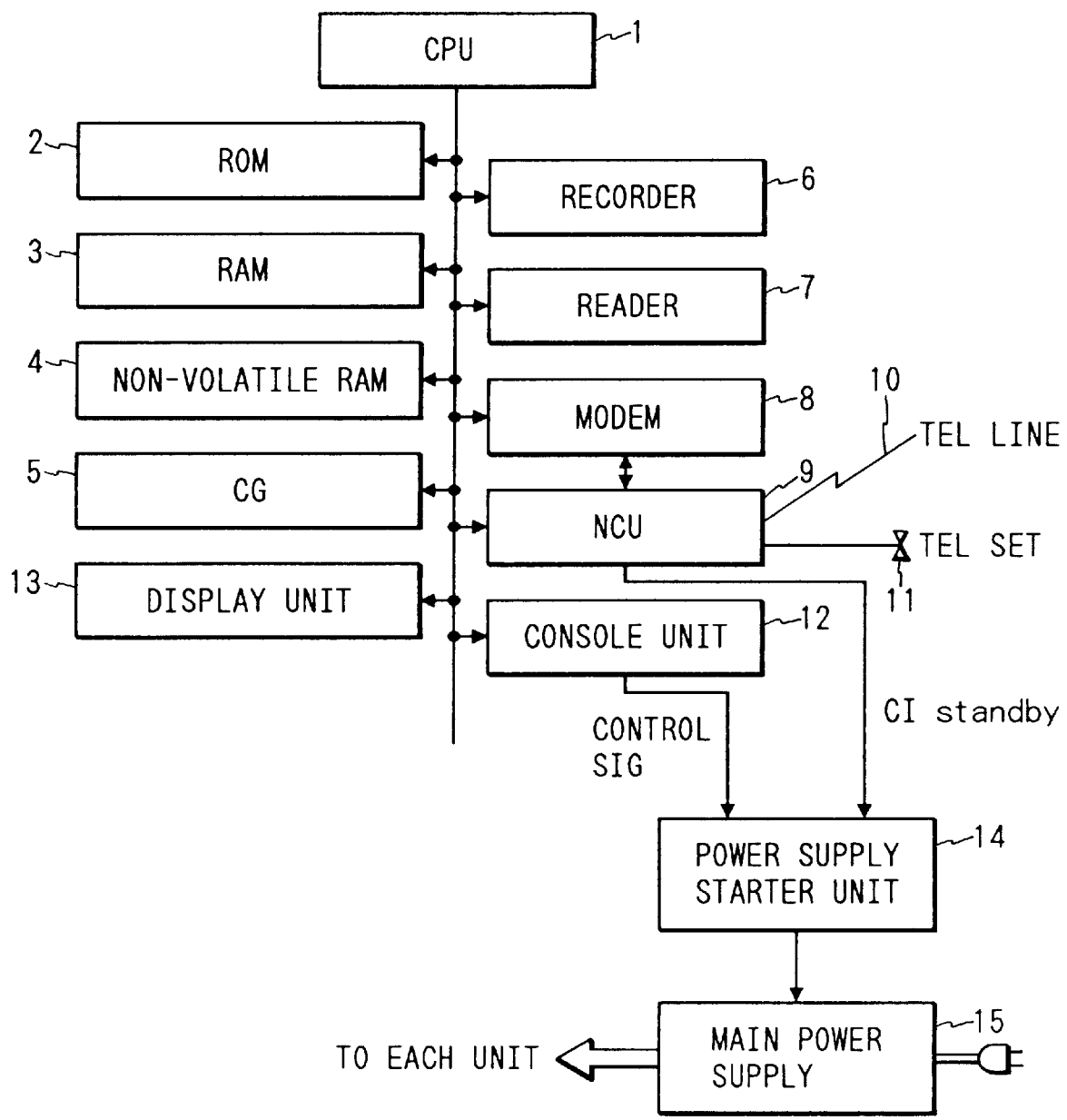
FIG. 1 is a block diagram showing the arrangement according to the first embodiment of the present invention.

FIG. 1 is a block diagram showing the arrangement of a facsimile apparatus according to the first embodiment. Referring to FIG. 1, a CPU 1 comprises a microprocessor, and controls the entire facsimile apparatus, i.e., a RAM 3, a non-volatile RAM 4, a character generator (CG) 5, a recorder 6, a reader 7, a modem 8, a network control unit (NCU) 9, a console unit 12, and a display unit 13, in accordance with programs stored in a ROM 2.

The RAM 3 stores binary image data read by the reader 7 or binary image data to be recorded by the recorder 6, and also stores binary image data which is to be modulated by the modem 8, and is to be output onto a telephone line 10 via the NCU 9.

An analog waveform signal input from the telephone line 10 is demodulated via the NCU 9 and the modem 8. The RAM 3 also stores the demodulated binary data.

The non-volatile RAM 4 reliably stores data to be stored even after a power supply of the facsimile apparatus is turned off.

The CG 5 is a ROM for storing characters such as JIS codes, ASCII codes, and the like, and outputs 2-byte character data corresponding to a predetermined code as needed under the control of the CPU 1.

The recorder 6 comprises a DMA controller, a thermal head, a CMOS logic IC, and the like. The recorder 6 reads out recording data stored in the RAM 3 and records the readout data as a hard copy under the control of the CPU 1.

The reader 7 comprises a DMA controller, an image processing IC, an image sensor, a CMOS logic IC, and the like. The reader 7 binarizes data read by utilizing a CCD under the control of the CPU 1, and sequentially supplies the binary data to the RAM 3. The loading state of a document sheet to the reader 7 can be detected by a document sensor arranged in a convey path of a document sheet, and a document detect signal is input to the CPU 1 and a power supply starter unit 14.

The modem 8 comprises G3 and G2 modems, a clock generator connected to these modems, and the like. The modem 8 modulates transmission data stored in the RAM 3 and outputs the modulated data onto the telephone line 10 via the NCU 9 under the control of the CPU 1. The modem 8 receives an analog signal on the telephone line 10 via the NCU 9, demodulates the received data to obtain binary data, and stores the binary data in the RAM 3.

The NCU 9 selectively connects the telephone line to the modem 8 or a telephone set 11 under the control of the CPU 1. The NCU 9 has a means for detecting a ringing signal (CI).

The telephone set 11 is a telephone set integrated with the facsimile apparatus main body. More specifically, the telephone set 11 comprises a handset, a speech network, a dialer, a ten-key pad or one-touch keys, and the like.

The console unit 12 comprises a key for starting image transmission, reception, and the like, a mode selection key for selecting an operation mode such as a fine mode, a standard mode, an auto-receive mode, and the like in transmission/reception, a ten-key pad used in dialing, and the like. The CPU 1 detects the depression states of these keys, and controls the above-mentioned units in accordance with the detected states.

The display unit 13 comprises a liquid crystal display for performing a 16-digit display, and displays predetermined characters, and the like under the control of the CPU 1.

The power supply starter unit 14 controls energization (power supply) to the respective units of the facsimile apparatus main body, and comprises a one-chip microcomputer, a secondary battery, and the like. The power supply starter unit 14 generates a power supply starter signal in accordance with a start signal from the NCU 9 or the console unit 12, and supplies the generated signal to a main power supply 15.

The main power supply 15 is an AC-input switching power supply, and its switching operation can be externally ON/OFF-controlled. The main power supply 15 supplies electric power or stops power supply to the respective units in accordance with a signal from the power supply starter unit 14.

Figure 2:
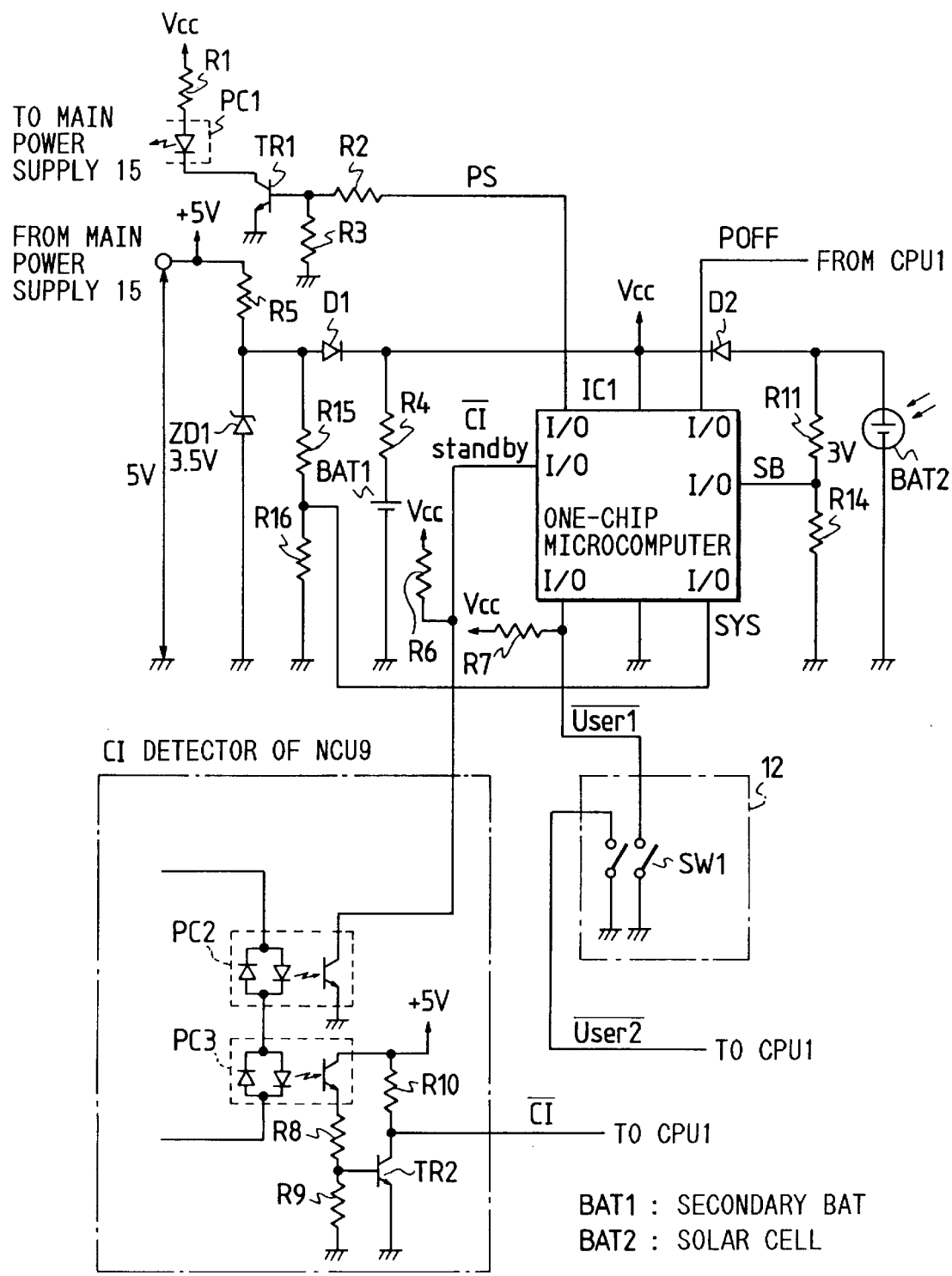
FIG. 2 is a circuit diagram showing the arrangement of a power supply starter unit shown in FIG. 1.

FIG. 2 is a circuit diagram showing the schematic arrangement of the power supply starter unit 14. Referring to FIG. 2, a 4-bit one-chip microcomputer IC1 is an IC which can operate at an ultra-low consumption current. The one-chip microcomputer IC1 can receive its driving power in three ways, i.e., from +5 V from the main power supply 15, a solar cell BAT2, and a secondary battery BAT1. The priority levels of these three power supplies are determined by their voltages and diodes D1 and D2, and a voltage from the main power supply 15 is set to be about 3.5 V by a resistor R5 and a Zener diode ZD1, a voltage from the solar cell BAT2 is set to be 3 V, and a voltage from the secondary battery BAT1 is set to be a power supply voltage (3.5 V or 3 V) upon charging.

When a system power supply voltage from the main power supply 15 is set up, this power supply has the highest priority due to the directions of the diodes D1 and D2, charges the secondary battery BAT1, and supplies a current to the one-chip microcomputer IC1. At this time, the solar cell BAT2 is set at a low potential, and does not supply any current to the one-chip microcomputer IC1. When the system power supply is shut down, and the solar cell BAT2 is set up, i.e., when light energy is supplied, if the potential of the secondary battery BAT1 is initially higher than that of the solar cell BAT2, electric power is supplied from the secondary battery BAT1 to the one-chip microcomputer IC1, and is not supplied from the solar cell BAT2. Thereafter, when the voltage output from the secondary battery BAT1 is lowered due to discharging, and becomes lower than the voltage from the solar cell BAT2, electric power is supplied from the solar cell BAT2 to the one-chip microcomputer IC1, and at the same time, the secondary battery BAT1 is charged via a resistor R4.

When both the system power supply and the solar cell BAT2 are shut down, electric power is supplied from the secondary battery BAT1 to the one-chip microcomputer IC1.

The one-chip microcomputer IC1 comprises an internal timer means, and has I/O ports. The I/O ports include an input port for receiving a signal SB via resistors R11 and R14 as voltage detect means so as to monitor the state of the solar cell BAT2, an input port for receiving a signal SYS via resistors R15 and R16 as voltage detect means so as to monitor the state of the system power supply, an input port for receiving a signal CIstandby (inverted signal) so as to detect CI (a ringing signal from the line) from a CI detector of the NCU 9, an input port for receiving a signal User1 (inverted signal) as the state of a switch SW1 including two circuits from the console unit 12, an output port for outputting a signal PS which is supplied to the main power supply 15 to control oscillation of the switching power supply (when oscillation is to be stopped, the signal PS is kept at Hi (high level); when oscillation is to be continued, the signal PS is kept at Lo (low level)), and an input port for receiving a signal POFF which is set at Hi when the CPU 1 completes a predetermined operation and oscillation of the power supply is to be stopped.

The CI detector of the NCU 9 supplies the signal CIstandby to the one-chip microcomputer IC1, and at the same time, supplies a signal CI to the CPU 1. On the other hand, the console unit 12 supplies the signal User1 to the one-chip microcomputer IC1, and at the same time, supplies a signal User2 to the CPU 1. The switch SW1 is turned in response to a document detect signal and when an operator performs some operation.

Note that the power supply starter unit 14 includes photo-couplers PC1, PC2, and PC3, transistors TR1 and TR2, and resistors R1 to R3 and R8 to R10 in FIG. 2.

Figure 3:
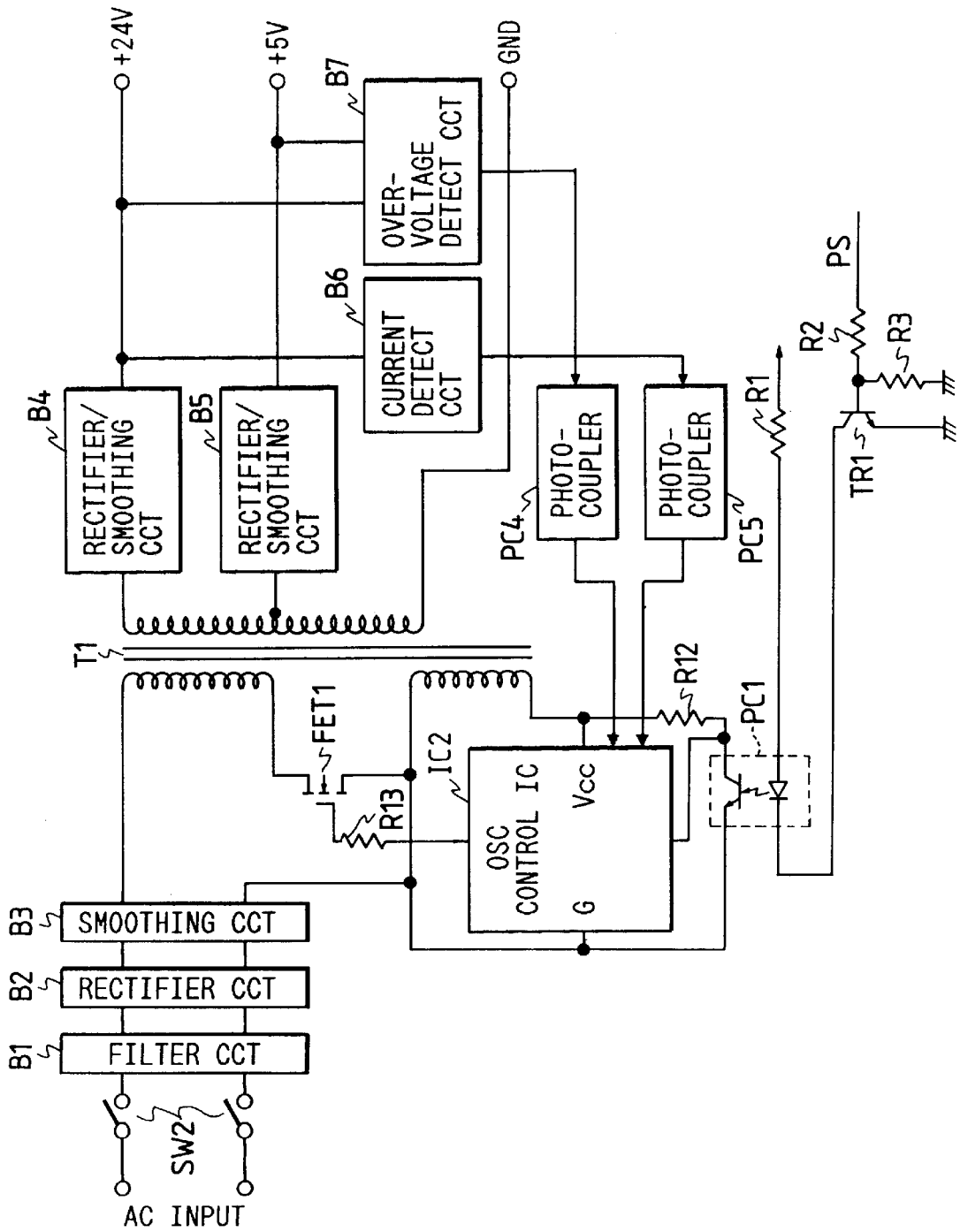
FIG. 3 is a block diagram showing the arrangement of the main power supply shown in FIG. 1.

FIG. 3 is a block diagram showing the arrangement of the main power supply 15 comprising the switching power supply. An AC input received via a switch SW2 is supplied to an insulating transformer T1 having primary and secondary windings via a filter circuit B1, a rectifier circuit B2, and a smoothing circuit B3, and is switched by a transistor FET1. An oscillation control IC IC2 performs oscillation control of the primary side of the transformer T1, and its power supply voltage Vcc is supplied from an auxiliary winding wound in the transformer T1.

The secondary side of the transformer T1 supplies power supply voltages of +24 V and +5 V from the secondary winding to the respective units of the apparatus main body via rectifier/smoothing circuits B4 and B5. A current detect circuit B6 and an overvoltage detect circuit B7 feed back their outputs to the oscillation control IC IC2 via photo-couplers PC4 and PC5. The oscillation control IC IC2 performs PWM control based on a current at the secondary side. When an overvoltage is detected, the oscillation control IC IC2 shuts down the entire system.

The signal PS as a signal unique to this embodiment is input to the oscillation control IC IC2 via the photo-coupler PC1. When the signal PS is Hi (active), the oscillation control IC IC2 stops oscillation, and stops power supply to the secondary side of the transformer T1. At this time, almost no current is supplied to the primary side of the transformer, either. When the signal PS is Lo, the oscillation control IC IC2 performs a normal operation (the power supply oscillates). At this time, the photo-coupler PC1 performs insulation between the primary and secondary sides and current-voltage conversion. Note that resistors R12 and R13 are used for limiting a current.

The operation of this embodiment will be described below with reference to the flow charts in FIGS. 4 and 5.

Figure 4:
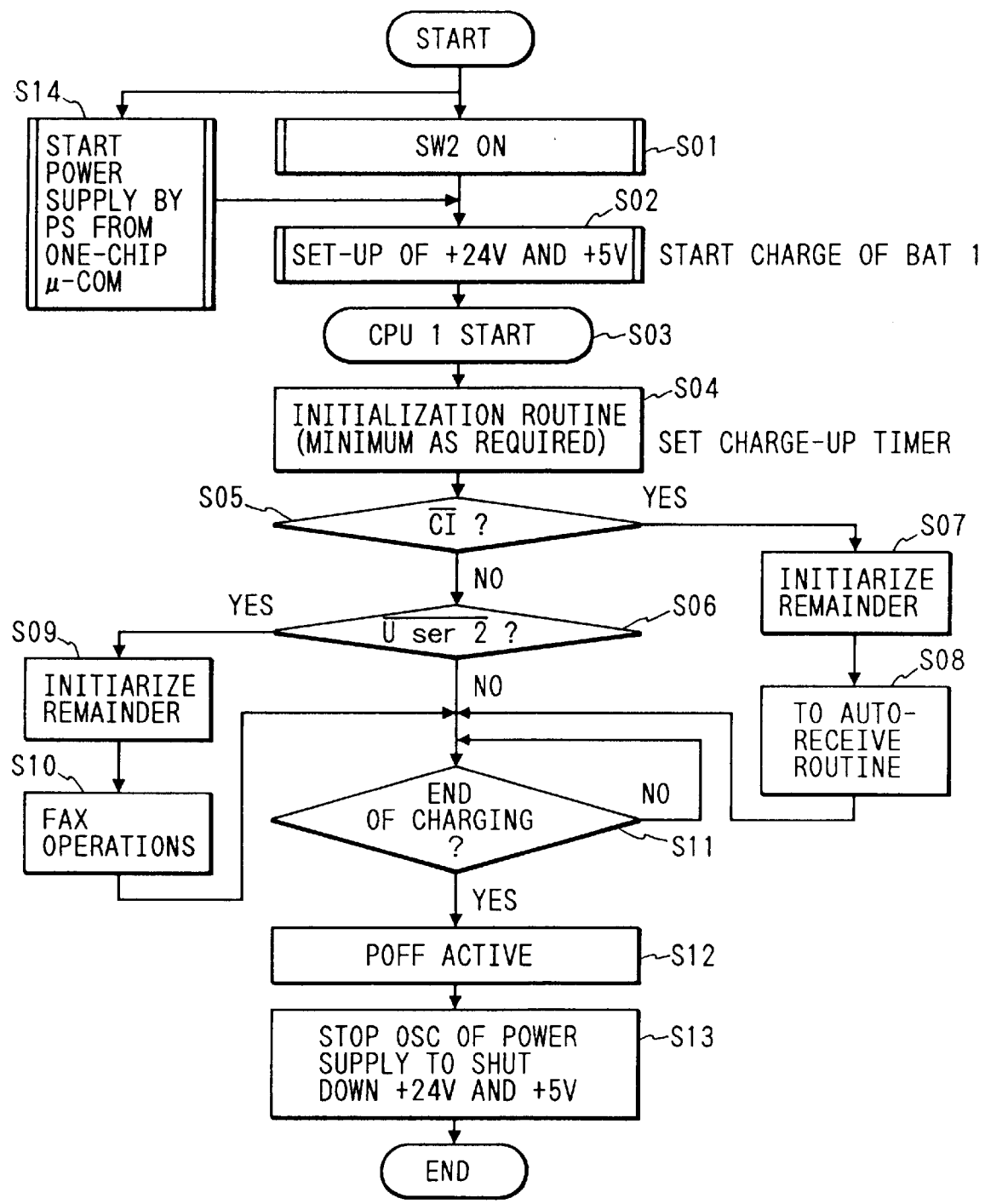
FIG. 4 is a flow chart showing the operation of a CPU shown in FIG. 1.

FIG. 4 is a flow chart showing the operation of the CPU 1. When a user turns on the power supply switch SW2 in step S01, voltages of +24 V and +5 V as system power supply voltages are set up, are supplied to the apparatus main body, and start charging of the secondary battery BAT1 (step S02). In step S03, the CPU 1 is started. The same applies to a case wherein the power supply is started in response to the signal PS from the one-chip microcomputer IC1 in step S14.

In step S04, the CPU 1 executes initialization of minimum required items, and sets and starts a charge-up timer. In step S05, it is checked if the signal CI is detected. If YES in step S05, the CPU 1 performs initialization of remaining items in step S07, and thereafter, the flow advances to step S08 to execute an auto-receive routine. However, if NO in step S05, it is checked in step S06 if the signal User2 is detected. If YES in step S06, the CPU 1 performs initialization of remaining items in step S09, and thereafter, the flow advances to step S10 to execute a FAX operation. The FAX operation includes transmission, manual reception, copying, and the like.

If NO in step S06 or if the predetermined operation is completed in step S08 or S10, the end of charging of the charge-up timer which was started in step S04 is checked in step S11. The control waits in step S11 until the end of charging is detected. The state at that time is the same as the normal standby state, and the control waits for various inputs. When a transmission/reception request, a copy request, or the like is issued before the end of charging, the charge-up timer is checked again after the corresponding operation is completed.

If the end of charging is detected in step S11, the CPU 1 sets the signal POFF to be active in step S12, and supplies a command for stopping oscillation of the power supply to the one-chip microcomputer IC1. As a result, the system power supply voltages of +24 V and +5 V are shut down in step S13.

Figure 5:
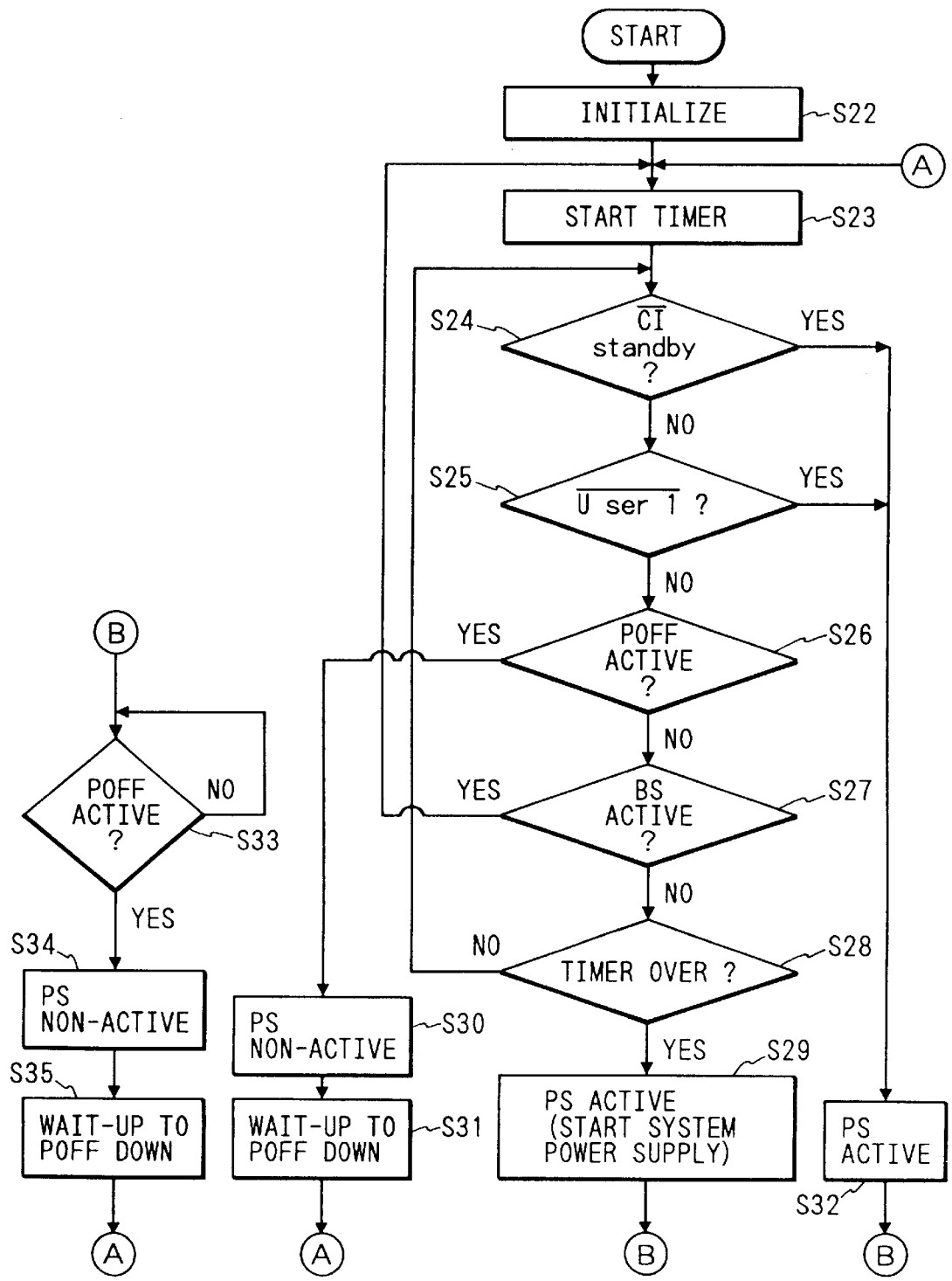
FIG. 5 is a flow chart showing the operation of a one-chip microcomputer shown in FIG. 2.

FIG. 5 is a flow chart showing the operation of the one-chip microcomputer IC1. In step S22, flags, I/O ports, and the like are initialized. In step S23, an internal timer is started. This timer measures a time in which power supply is guaranteed by discharging from the secondary battery BAT1 when the power supply voltages from the system power supply and the solar cell BAT2 are shut down.

It is then checked in steps S24 and S25 if the signals CIstandby and User1 are detected. If one of these signals is detected, the signal PS is set to be active (to start and keep oscillation of the power supply) in step S32. Thereafter, the control waits in step S33 until the CPU 1 sets the signal POFF to be active after it completes a predetermined operation. When the signal POFF is active, the signal PS is set to be non-active (to stop oscillation of the power supply) in step S34. In step S35, the control waits until the signal POFF is shut down, and thereafter, the flow returns to step S23.

If it is determined in steps S24 and S25 that neither of the signals CIstandby and User1 are detected, it is then checked in step S26 if the signal POFF from the CPU 1 is active. When the signal POFF is active, the signal PS is set to be non-active (to stop oscillation of the power supply) in step S30. In step S31, the control waits until the signal POFF is shut down, and thereafter, the flow returns to step S23.

If it is determined in step S26 that the signal POFF is non-active, it is checked in step S27 if the signal SB (the start signal of the solar cell BAT2) is active. If the solar cell BAT2 is started, the flow returns to step S23. If the solar cell BAT2 is not started, it is checked in step S28 if the timer which was set in step S23 is over. If NO in step S28, the flow returns to step S24. However, if YES in step S28, since the secondary battery must be charged, the signal PS is set to be active (to start the system power supply) in step S29. Thereafter, the system power supply is set up, and the control waits in step S33 until the signal POFF from the CPU 1 is set to be active.

The first embodiment described above comprises the solar cell BAT2, but may not often comprise any solar cell. In this case, since the secondary battery BAT1 is not charged by the solar cell BAT2, the power supply must be forcibly set up more frequently than in the first embodiment to charge the secondary battery when the facsimile apparatus is not frequently used.

The timer is used for charging the secondary battery BAT1 as the power supply of the power supply starter unit 14. When the main power supply is not started for a predetermined period of time, and the secondary battery BAT1 is not charged, the main power supply 15 is forcibly started. Alternatively, the power supply starter unit 14 may comprise voltage detect means of the secondary battery BAT1, and when the voltage from the secondary battery BAT1 becomes equal to or lower than a predetermined threshold value, the main power supply 15 may be forcibly set up.

As described above, in the facsimile apparatus with the auto-receive function, electric power in the standby state can be set to be almost 0 W, and the power consumption amount per day can be reduced to 1/10 to 1/100. Also, since oscillation of the power supply is stopped in the standby state, the facsimile apparatus does not generate radiation noise at all, and does not adversely influence other electronic devices.

Since the power supply starter unit 14 is always operated by the secondary battery BAT1, an operation equivalent to a normal operation can be realized.

Furthermore, since the number of control lines of the primary side of the power supply is only one, a countermeasure associated with safety standards can be easily taken, and hence a switch input from the user is safely input since it is supplied via the power supply starter unit 14.

Moreover, since the solar cell BAT2 is used, it appeals its contribution to ecology problems to users.

As described above, since the first embodiment comprises the power supply starter unit for controlling energization to the respective units of the facsimile apparatus main body, and the main power supply, the secondary battery, and the solar cell (if necessary) are arranged to perform power supply to the power supply starter unit, power consumption in the standby state can be reduced to almost 0 W, resulting in a small total power consumption amount. In addition, since the apparatus is free from generation of radiation noise, it does not adversely influence other electronic devices, and limitations associated with the safety standards can be removed.

(Second Embodiment)

When electric power is supplied from a secondary battery to a main power supply control unit for controlling a main power supply, power consumption can be reduced since the main power supply is stopped in a standby state. However, since the main power supply control unit controls the main power supply, the following problems are posed.

More specifically, when an apparatus is designed to set up the main power supply while an AC input is being input, in order to stop the main power supply in a standby state, the main power supply control unit must keep outputting a control signal for stopping the main power supply during a standby period. For this reason, consumption of the secondary battery is accelerated, thus disturbing low power consumption.

Alternatively, when an apparatus is designed such that the main power supply is not set up only if an AC input is started, but is set up when a control signal for setting up the main power supply is supplied from the main power supply control unit to the main power supply in this state, no problem is posed when the secondary battery is fully charged. However, when the secondary battery is fully discharged, the main power supply control unit cannot supply a control signal for setting up the main power supply to the main power supply.

The second embodiment has been made in consideration of the above-mentioned problems, and has as its object to provide a power supply device which can realize low power consumption, and can set up the main power supply even when the secondary battery is fully discharged.

Figure 6:
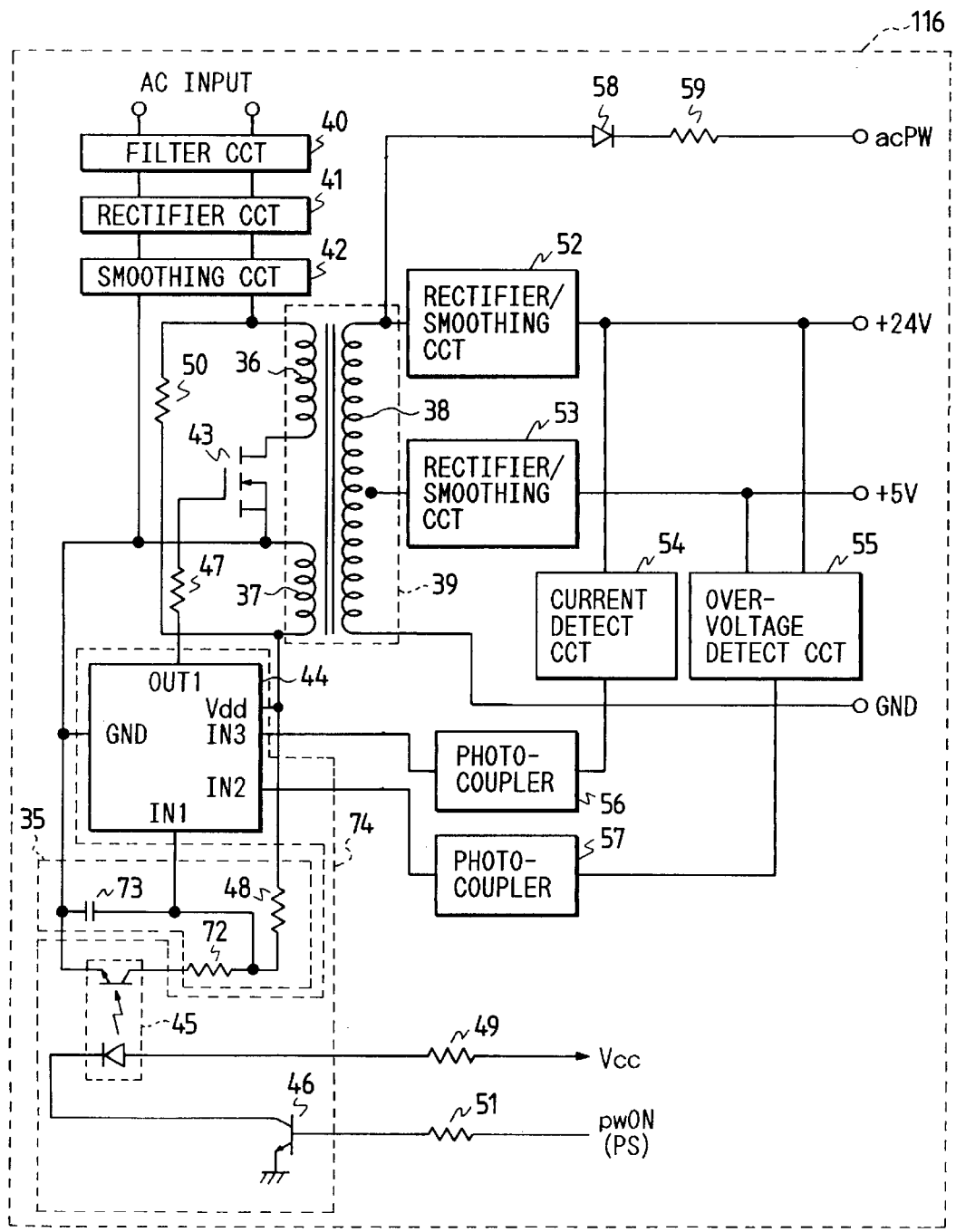
FIG. 6 is a circuit diagram showing the arrangement according to the second embodiment of the present invention.

FIG. 6 is a circuit diagram showing the arrangement of a power supply device according to the second embodiment. Referring to FIG. 6, an insulating transformer (output transformer) 39 generates AC electric power to a secondary winding 38 upon oscillation of a primary winding 36. An AC input to this power supply device is supplied to the insulating transformer 39 with the primary and secondary windings via a filter circuit 40, a rectifier circuit 41, and a smoothing circuit 42, and the primary side of the insulating transformer 39 is switched (ON/OFF-controlled) by an FET 43 as switch means.

An IC 44 controls oscillation control at the primary side of the insulating transformer 39. While an input port IN1 of the IC 44 is at Low level, an output port OUT1 keeps oscillating, and during this interval, the primary side of the insulating transformer 39 oscillates. While the input port IN1 is at High level, the output port OUT1 maintains Low level, and during this interval, the primary side of the insulating transformer 39 stops oscillation. A power supply voltage (Vdd) to this IC 44 is supplied from an auxiliary winding 37 wound in the insulating transformer 39. The secondary side of the insulating transformer 39 supplies power supply voltages of +24 V and +5 V from the secondary winding 39 to a facsimile apparatus main body 101 shown in FIG. 7 via rectifier/smoothing circuits 52 and 53.

A current detect circuit 54 and an overvoltage detect circuit 55 feed back their outputs to the IC 44 via photo-couplers 56 and 57, respectively. The IC 44 performs PWM control based on a current at the secondary side. When an overvoltage is detected, the IC 44 shuts down the entire system.

A signal PS for controlling the power supply device is supplied from an external circuit to the IC 44 via a photo-coupler 45. When the signal PS is at High level, a transistor 46 is enabled, and a current is supplied to the photo-coupler 45. Then, the photo-coupler 45 performs current-voltage conversion, and the input port IN1 of the IC 44 goes to Low level. The output port OUT1 of the IC 44 oscillates accordingly, and the primary side of the transformer 39 oscillates via the FET 43 and supplies electric power to the secondary side. Thus, the power supply device is set up, and starts its operation. When the signal PS is at Low level, the transistor 46 is disabled, and the input port IN1 of the IC 44 goes to High level. The output port OUT1 of the IC 44 goes to Low level accordingly, and the FET 43 is disabled. Thus, oscillation at the primary side of the transformer 39 is stopped, and power supply to the secondary side is stopped, thereby stopping the operation of the power supply device.

The power supply device also includes current limiting resistors 47, 49, 50, and 51, a reverse-flow prevention diode 58, and a current limiting resistor 59. Note that the photo-coupler 45 also performs insulation between the primary and secondary sides.

A delay circuit 35 is constituted by resistors 48 and 72, and a capacitor 73, and its time constant is determined by the resistors 48 and 72, and the capacitor 73. When the resistances of the resistors 48 and 72, and the capacitance of the capacitor 73 are changed, the time constant can be varied. A switching control unit 74 is constituted by the IC 44, the photo-coupler 45, and the transistor 46, and can ON/OFF-control the FET 43 in accordance with an external signal.

When power supply from a power supply source is started, the switching control unit 74 automatically oscillates (enables/disables) the FET 43 for a predetermined period of time determined by the delay circuit 35, thereby oscillating the primary side of the insulating transformer 39. Before an elapse of the predetermined period of time, the switching control unit 74 is externally controlled so as to ON/OFF-control the FET 43 in accordance with an external instruction (signal), thereby controlling oscillation at the primary side of the insulating transformer 39.

An OFF signal for disabling the FET 43 to stop oscillation at the primary side of the insulating transformer 39 so as to stop power supply to the secondary side of the insulating transformer 39 is a signal which does not consume any electric power.

Figure 7:
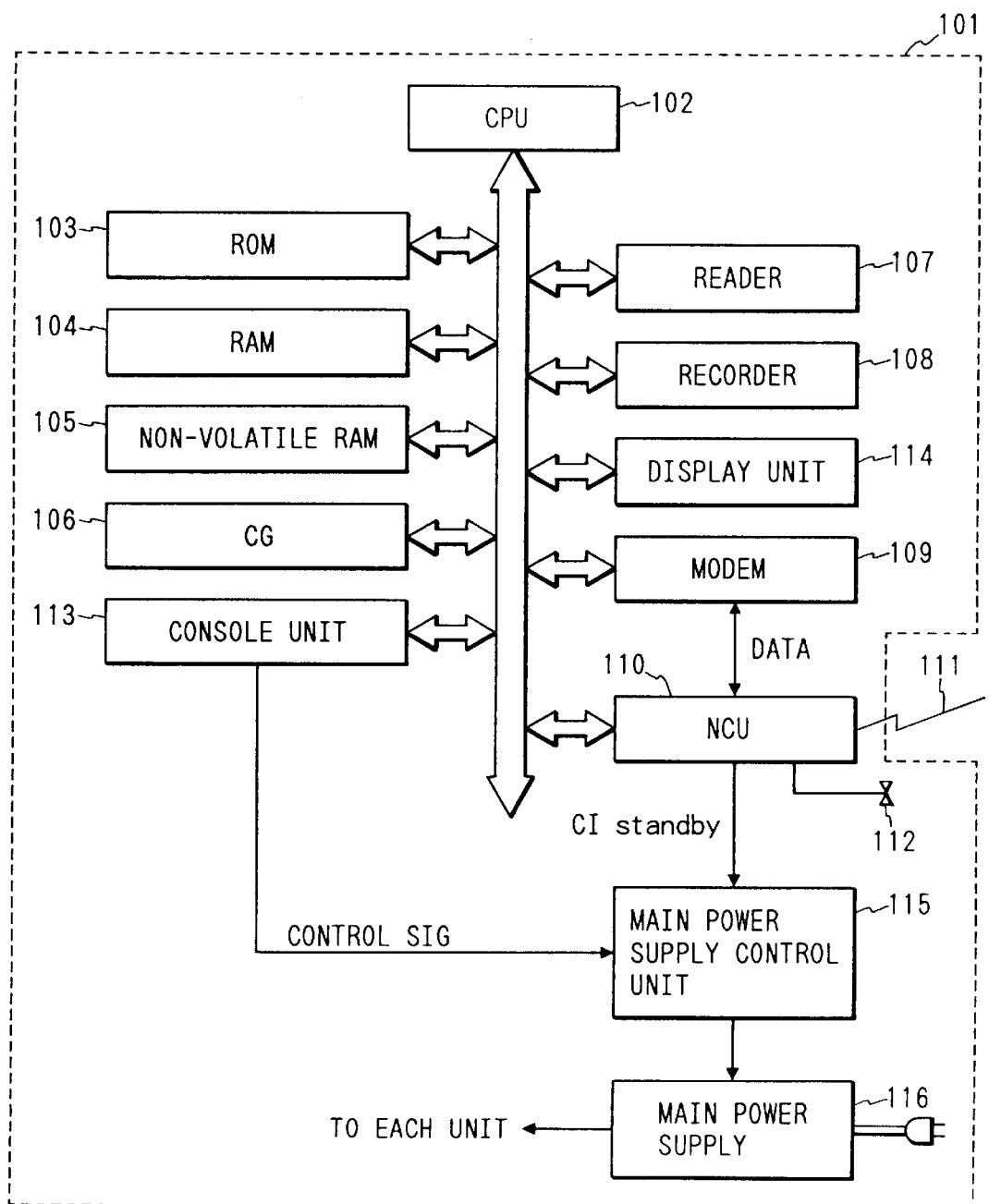
FIG. 7 is a block diagram showing the arrangement of a facsimile apparatus which adopts a main power supply with the arrangement shown in FIG. 6.

FIG. 7 is a block diagram showing the arrangement of a facsimile apparatus which uses the above-mentioned power supply device as a main power supply 116. Referring to FIG. 7, an apparatus main body 101 of the facsimile apparatus includes a CPU 102 comprising, e.g., a microprocessor. The CPU 102 controls the system of the entire apparatus in accordance with a program stored in a ROM 103. The CPU 102 controls a RAM 104 which can read/write data, a non-volatile RAM 105, a character generator (CG) 106, a document reader 107, a recorder 108, a modem 109, a network control unit (NCU) 110, a console unit 113, and a display unit 114.

The RAM 104 stores binary image data read by the reader 107 or binary image data to be recorded by the recorder 108. The RAM 104 also stores binary image data which is to be modulated by the modem 109 and is to be output onto a telephone line 111 via the NCU 110. Furthermore, the RAM 104 stores binary image data which is obtained by demodulating an analog waveform data input from the telephone line 111 via the NCU 110 and the modem 109.

The non-volatile RAM 105 reliably stores data to be preserved such as abbreviated dial number data even after the power supply of the apparatus main body 101 is shut down. The ROM 103 stores character data such as JIS code, ASCII codes, and the like, and outputs 2-byte character data corresponding to a predetermined code under the control of the CPU 102.

The reader 107 comprises a DMA controller, an image processing IC, an image sensor, a CMOS logic IC, and the like. The reader 107 binarizes data read by utilizing a contact sensor (CS) and sequentially supplies the binary data to the RAM 104 under the control of the CPU 102. The set state of a document sheet on the reader 107 can be detected by a mechanical document detect sensor arranged in a convey path of a document sheet, and a document detect signal from the sensor is input to a main power supply control unit 115 for controlling a main power supply 116 and to the CPU 102.

The recorder 108 comprises a DMA controller, an ink-jet recording device, a CMOS logic IC, and the like. The recorder reads out recording data stored in the RAM 104 and records the readout data as a hard copy under the control of the CPU 102. The modem 109 comprises G3 and G2 modems, a clock generator connected to these modems, and the like. The modem 109 modulates transmission data stored in the RAM 104 and outputs the modulated data onto the telephone line 111 via the NCU 110 under the control of the CPU 102. Also, the modem 109 receives an analog signal on the telephone line 111 via the NCU 110, and stores binary data, obtained by demodulating the analog signal, in the RAM 104.

The NCU 110 selectively switches the telephone line 111 to the modem 109 or a telephone set 112 under the control of the CPU 102. The NCU 110 has a detect means for detecting a ringing signal (CI). Upon detection of the ringing signal, the NCU 110 supplies an incoming call signal to the main power supply control unit 115 and the CPU 102.

The telephone set 112 is integrated with the apparatus main body 101, and comprises a handset, a speech network, a dialer, a ten-key pad or one-touch keys, and the like. The console unit 113 comprises a start key for starting image transmission, reception, and the like, a mode selection key for designating an operation mode such as a "fine" mode, a "standard" mode, an "auto-receive" mode, and the like in transmission/reception, a ten-key pad or one-touch keys for dialing, and the like. When one of these keys is depressed, an ON signal of the corresponding key is supplied to the main power supply control unit 115 and the CPU 102.

The display unit 114 comprises a liquid crystal display for performing a 16-digit display, and displays predetermined characters and the like under the control of the CPU 102. The main power supply control unit 115 controls energization (power supply) to the respective units of the apparatus main body 101, and comprises a one-chip microcomputer, a capacitor-type secondary battery, and the like. The main power supply control unit 115 can be driven by only electric power supplied from the secondary battery. The main power supply control unit 115 outputs a start signal to start the main power supply 116 upon reception of a document detect signal from the reader 107, an incoming call signal from the NCU 110, or an ON signal from the console unit 113. The main power supply 116 comprises an AC-input switching power supply, and its switching operation can be externally ON/OFF-controlled. The main power supply 116 starts or stops power supply in accordance with the start or stop signal from the main power supply control unit 115.

Figure 8:
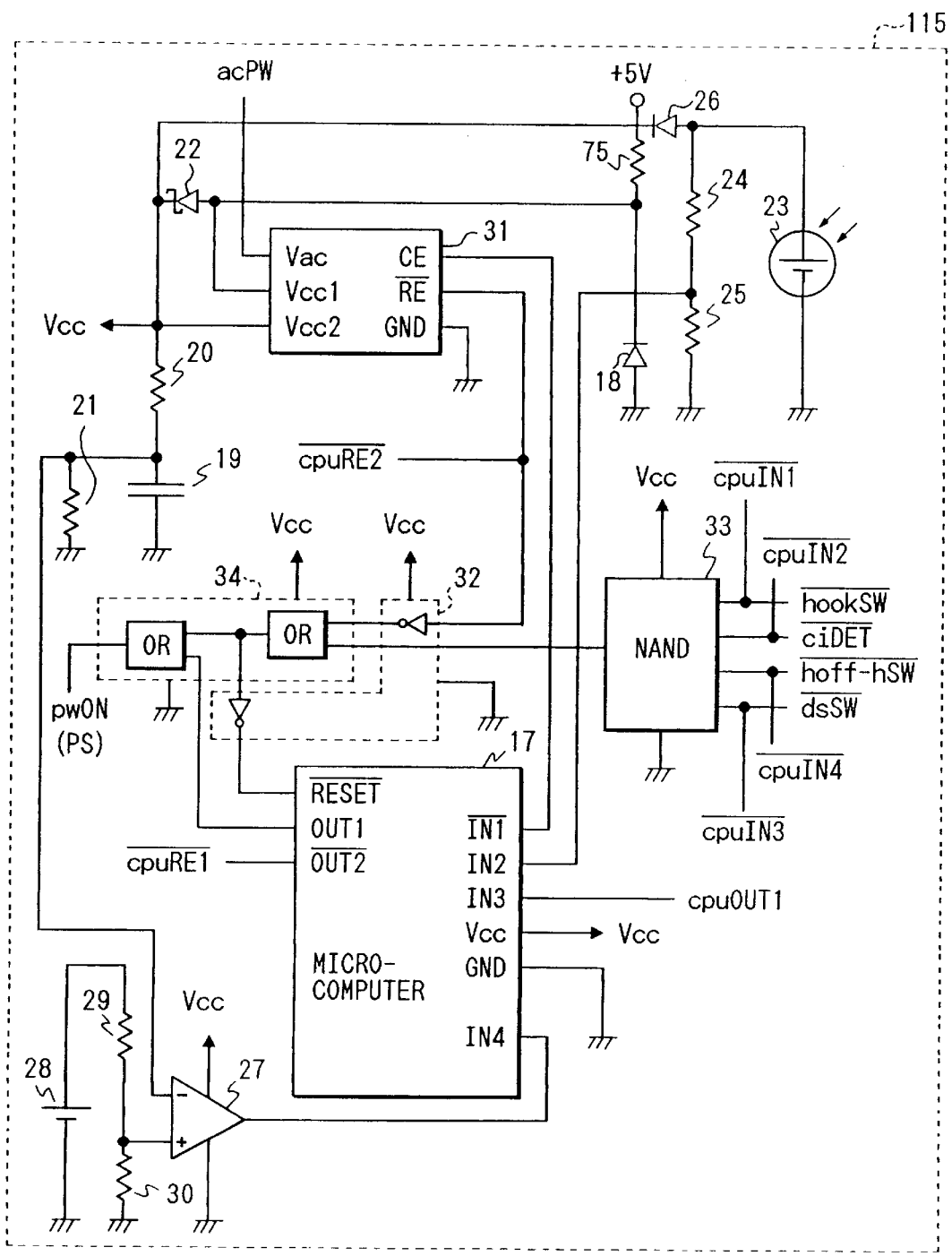
FIG. 8 is a circuit diagram showing the internal arrangement of a main power supply control unit.
Figure 9A:
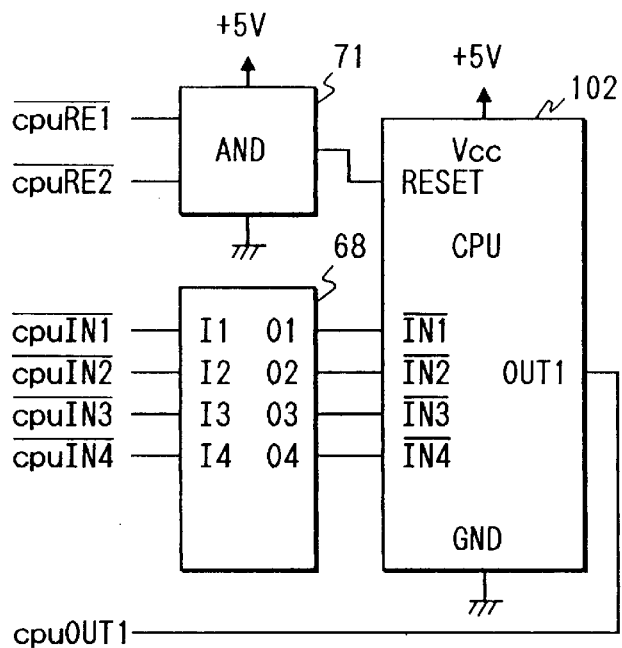
FIGS. 9A to 9C are circuit diagrams showing the circuit arrangements of the respective units shown in FIG. 7.
Figure 9B:
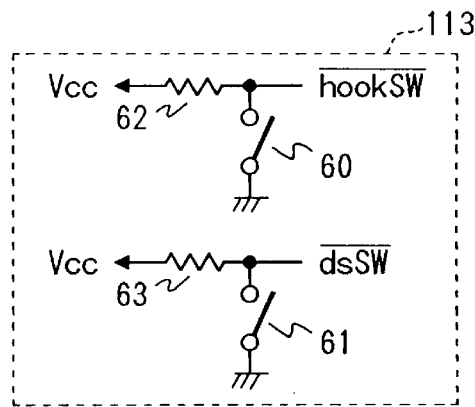
Figure 9C:
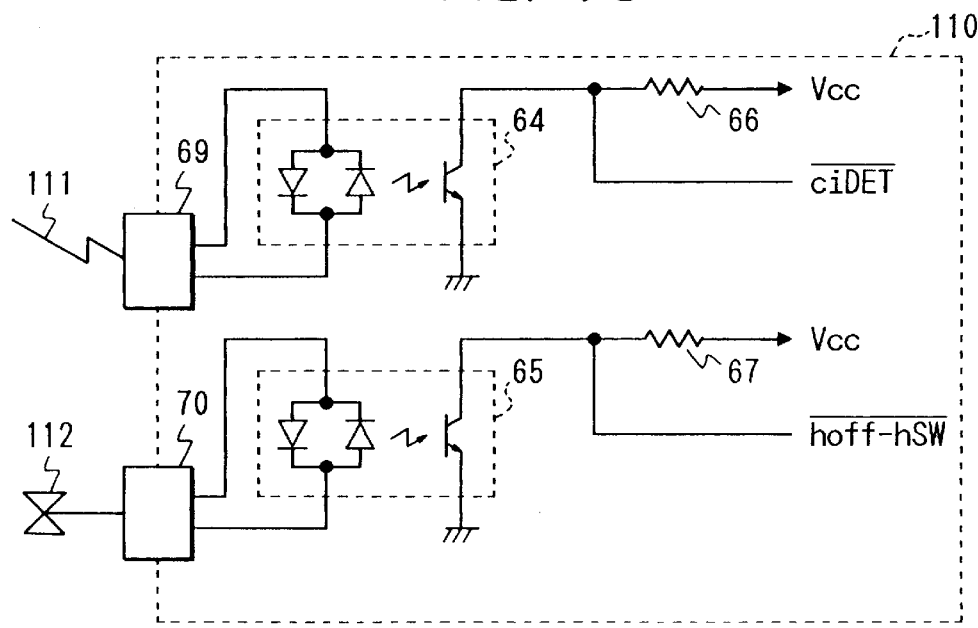

FIG. 8 is a circuit diagram showing the internal arrangement of the main power supply control unit 115, and FIGS. 9A to 9C are circuit diagrams showing the arrangements of various switch units and peripheral circuits of the CPU 102 in the apparatus main body 101.

Referring to FIGS. 8 to 9C, a power supply line Vcc connects three different power supply sources, i.e., a +5 V line from the main power supply 116, a solar cell 23, and the above-mentioned capacitor-type secondary battery 19. The priority levels of these three power supplies are determined by their voltages, a reverse-flow prevention Schottky barrier diode 22, and a reverse-flow prevention diode 26, and a voltage from the main power supply 116 is set to be about 4.8 V by a Zener diode 18 and the Schottky barrier diode 22, a voltage from the solar cell 23 is set to be 4.6 V, and a voltage from the secondary battery 19 is set to be 4.5 V (when fully charged).

When the main power supply 116 is set up, this power supply has the highest priority due to the directions of the diodes 22 and 26, and the main power supply 116 charges the secondary battery 19 and supplies electric power onto the line Vcc. At this time, the solar cell 23 is set at a low potential, and does not supply any current. When the main power supply 116 is not in operation, and the solar cell 23 is supplying electric power, i.e., when light energy is being supplied although the main power supply 116 is not in operation, if the potential of the secondary battery 19 is higher than that of the solar cell 23, electric power is supplied from the secondary battery 19 onto the line Vcc, and is not supplied from the solar cell 23. When the potential of the secondary battery 19 is lower than that of the solar cell 23, the solar cell 23 supplies electric power onto the line Vcc, and at the same time, charges the secondary battery 19 via a resistor 20. When neither the main power supply 116 nor the solar cell 23 are in operation, the secondary battery 19 supplies electric power onto the line Vcc.

Referring to FIG. 8, a 4-bit one-chip microcomputer 17 can operate with ultra-low power consumption, and comprises an internal timer means. Whether or not the solar cell 23 supplies electric power is determined by voltage-dividing the potential of the solar cell 23 by resistors 24 and 25, and inputting the voltage-divided value to an input port IN2 of the microcomputer 17. The voltage from the secondary battery 19 is detected by comparing it with the voltage from a primary battery 28 for backing up the RAM 105 by a comparator 27 via a voltage stabilization resistor 21. The output from the comparator 27 is supplied to an input port IN4 of the microcomputer 17. Note that resistors 29 and 30 are used for voltage-dividing the voltage from the primary battery 28.

An IC 31 compares a voltage Vac at the secondary side of the main power supply 116, a voltage Vcc1 of +5 V from the main power supply 116, and a voltage Vcc2 from the secondary battery 19. When the voltage Vcc1 becomes higher than 2 V, the CE output port of the IC 31 goes to High level. When the voltage Vac becomes equal to or lower than about 2 V, the CE output port goes to Low level. The output from the CE output port is supplied to an input port IN1 of the microcomputer 17. When the voltage Vcc2 becomes equal to or lower than 3 V, the RE output port of the IC 31 goes from High level to Low level, and a reset signal is kept output. When the voltage Vcc2 becomes higher than 3 V, the RE output port is kept at High level. The output from the RE output port is supplied to the RESET port of the microcomputer 17 via an inverter IC 32 and an OR gate IC 34. This output is also supplied to the RESET port of the CPU 102 via an AND gate IC 71 (FIG. 9A).

A NAND gate IC 33 receives a signal from a hooking switch 60, a mechanical document detect switch (or read switch) 61 (FIG. 9B), a ringing signal detect switch (photo-coupler) 64, or an off-hook detect switch (photo-coupler) 65 for the handset (FIG. 9C). The output from the IC 33 is supplied to the RESET port of the microcomputer 17 via the IC 34. Note that voltage adjustment resistors 62, 63, 66, and 67 in FIGS. 9B and 9C are respectively connected to the switches 60, 61, 64, and 65, and modular jacks 69 and 70 in FIG. 9C are respectively connected to the switches 64 and 65.

When an input port IN3 of the microcomputer 17 is at High level, it indicates that the CPU 102 is active. The output from an output port OUT1 of the microcomputer 17 is supplied to the main power supply 116 via the IC 34. An output port OUT2 of the microcomputer 17 outputs a reset signal to the CPU 102 via the AND gate IC 71. Note that a resistor 75 is used for adjusting a voltage.

FIGS. 9A to 9C show the circuit arrangements of the respective units in FIG. 7. FIG. 9A shows the peripheral circuits of the CPU 102, FIG. 9B shows the internal arrangement of the console unit 113, and FIG. 9C shows the internal arrangement of the NCU 110. Referring to FIGS. 9A to 9C, a delay circuit 68 is constituted by a resistor and a capacitor, delays signals input to its input ports I1 to I4 by a time required for initialization of the CPU 102, and outputs the delayed signals from output ports O1 to O4, respectively.

FIGS. 10 to 13 are flow charts showing the operation of this embodiment. The operation of this embodiment will be described below with reference to FIGS. 10 to 13.

Figure 10:
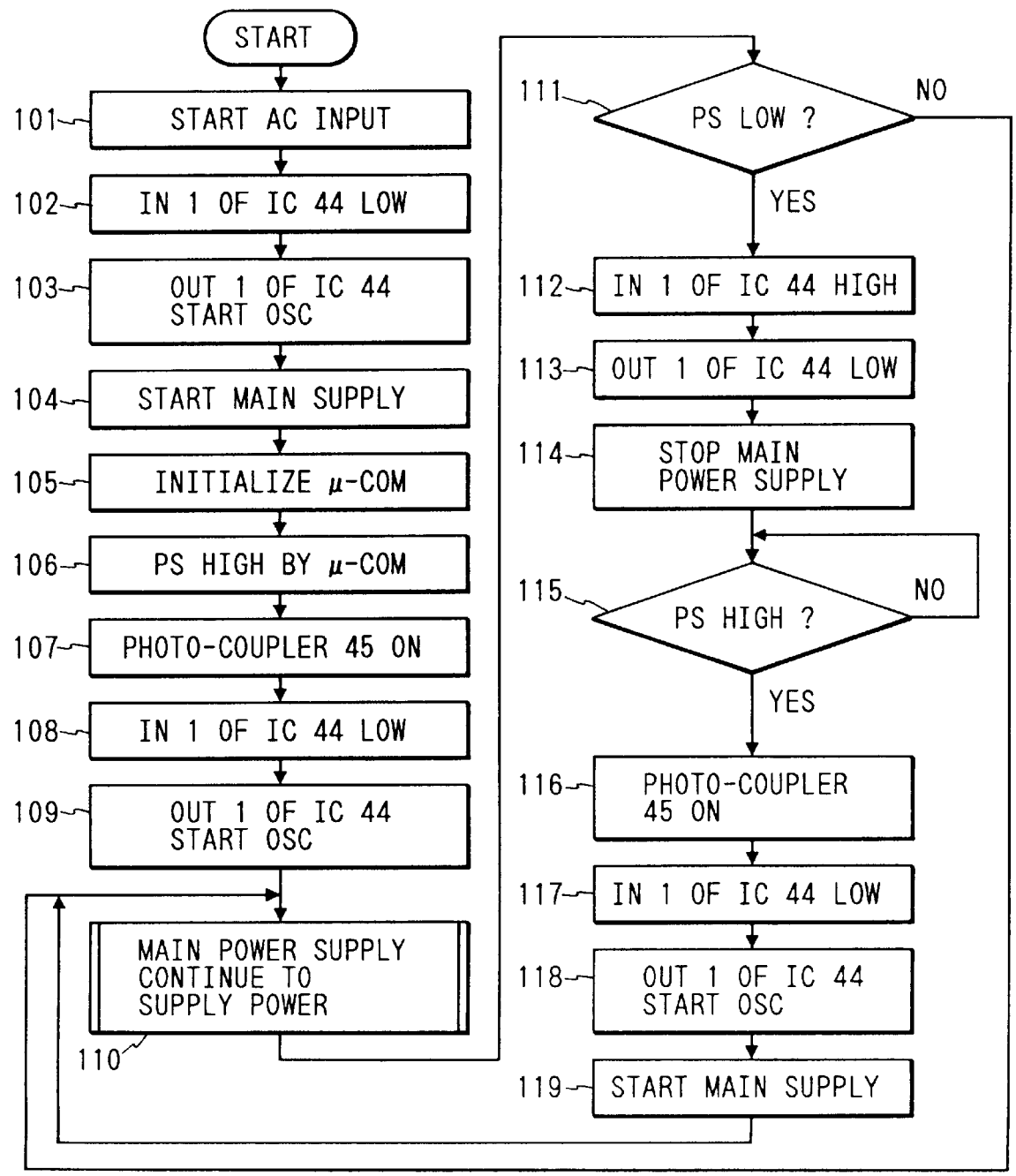
FIG. 10 is a flow chart showing the operation of the main power supply.

FIG. 10 is a flow chart showing the operation of the main power supply. When an AC input is started (step 101), since the input port IN1 of the IC 44 is set at Low level by the delay circuit 35 (step 102), the output port OUT1 of the IC 44 oscillates accordingly (step 103), and the primary side of the transformer 39 oscillates via the FET 43, thus supplying electric power to the secondary side. Thus, the main power supply 116 is started (step 104). When this power supply is started, the microcomputer 17 is initialized (step 105). Upon completion of initialization, the microcomputer 17 outputs a High-level signal from the output port OUT1, and the High-level signal is supplied, as a signal PS, to the main power supply 116 via the IC 34 (step 106).

When the transistor 46 is enabled by the signal PS, a current flows through the photo-coupler 45, and the photo-coupler 45 is turned on (step 107). Since the input port IN1 of the IC 44 goes to Low level (step 108), the output port OUT1 of the IC 44 oscillates accordingly (step 109), and the primary side of the transformer 39 oscillates via the FET 43, thus supplying electric power to the secondary side. Then, this state is maintained, and the main power supply 116 continuously performs power supply (step 110). Note that the time constant of the delay circuit 35 is set, so that the input port IN1 of the IC 44 is kept at Low level from when the AC input is started until the photo-coupler 45 is turned on by the signal PS from the microcomputer 17.

When the signal PS goes to Low level (step 111), the transistor 46 is disabled, and the photo-coupler 45 is turned off. Thus, the input port IN1 of the IC 44 goes to High level (step 112), and the IC 44 sets the output port OUT1 at Low level accordingly (step 113). Thus, the FET 43 is disabled, and the primary side of the transformer 39 stops oscillation to stop power supply to the secondary side. As a result, the main power supply 116 stops its operation (step 114). In this state, when the signal PS goes to High level (step 115), the transistor 46 is enabled, and the photo-coupler 45 is turned on (step 116). Thus, the input port IN1 of the IC 44 goes to Low level (step 117). The output port OUT1 of the IC 44 oscillates accordingly (step 118), and the primary side of the transformer 39 oscillates via the FET 43, thus supplying electric power to the secondary side. As a result, the main power supply 116 is started (step 119). Then, this state is maintained, and the main power supply 116 continuously performs power supply.

Figure 11:
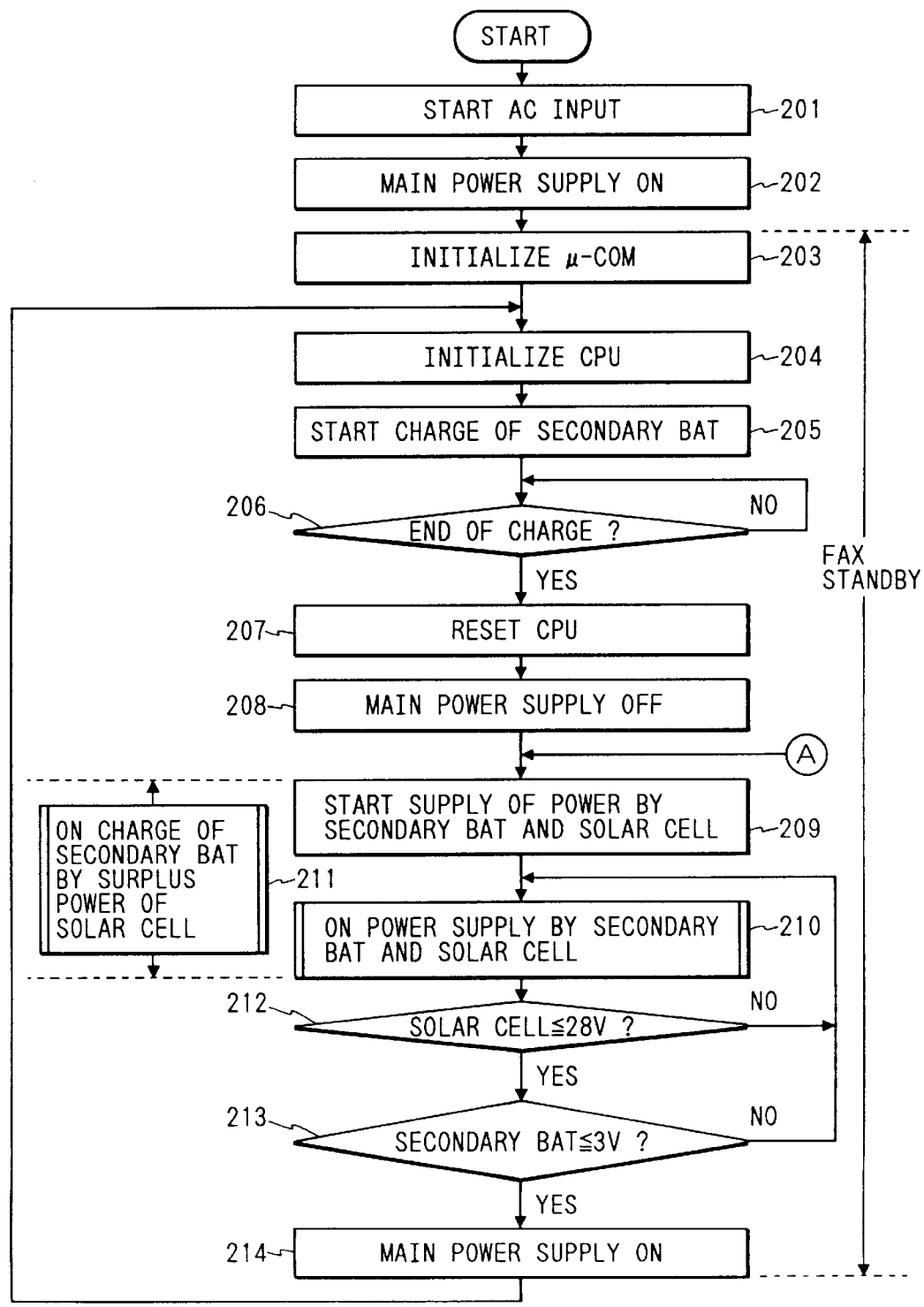
FIG. 11 is a flow chart showing the operation of the facsimile apparatus in a standby state.

FIG. 11 is a flow chart showing the operation in a FAX standby state. When an AC input is started (step 201), the main power supply 116 is turned on and started (step 202) to initialize the microcomputer 17 (step 203), to initialize the CPU 102 (step 204), and at the same time, to start charging of the secondary battery 19 (step 205). Upon completion of initialization of the microcomputer 17, the facsimile apparatus is set in a standby state, and while this standby state continues, the secondary battery 19 is kept charged.

Upon completion of charging of the secondary battery 19 (step 206), i.e., when the output from the comparator 27 goes to High level or when the internal timer of the microcomputer 17 has measured one hour, the main power supply 116 stops. At this time, in the former case, since the port IN4 of the microcomputer 17 goes to High level, the microcomputer 17 resets the CPU 102 accordingly (step 207), and stops the operation of the main power supply 116 (step 208). Then, power supply only by the secondary battery 19 and the solar cell 23 is started (step 209). Similarly, in the latter case, the microcomputer 17 resets the CPU 102 according to the contents of the internal timer, and stops the operation of the main power supply 116. Then, power supply only by the secondary battery 19 and the solar cell 23 is started (step 210). In either case, the secondary battery 19 is charged by surplus power of electric power supplied from the solar cell 23 (step 211).

When electric power supplied from the solar cell 23 decreases, and its voltage becomes equal to or lower than 2.8 V (step 212), the secondary battery 19 begins to discharge. When the voltage from the secondary battery 19 becomes equal to or lower than 3 V (step 213), the RE output port of the IC 31 goes to Low level, and the above-mentioned signal PS goes to High level. Therefore, the photo-coupler 45 is turned on, and the port IN1 of the IC 44 goes to Low level. According to the output from the port IN1, the port OUT1 of the IC 44 oscillates, and the primary side of the transformer 39 oscillates via the FET 43, thus supplying electric power to the secondary side. Thus, the main power supply 116 is started (step 214). During this operation, the CPU 102 is initialized, and charging of the secondary battery 19 is started. In this manner, the secondary battery 19 is charged again while maintaining the FAX standby state. Then, this cycle is repeated.

Figure 12:
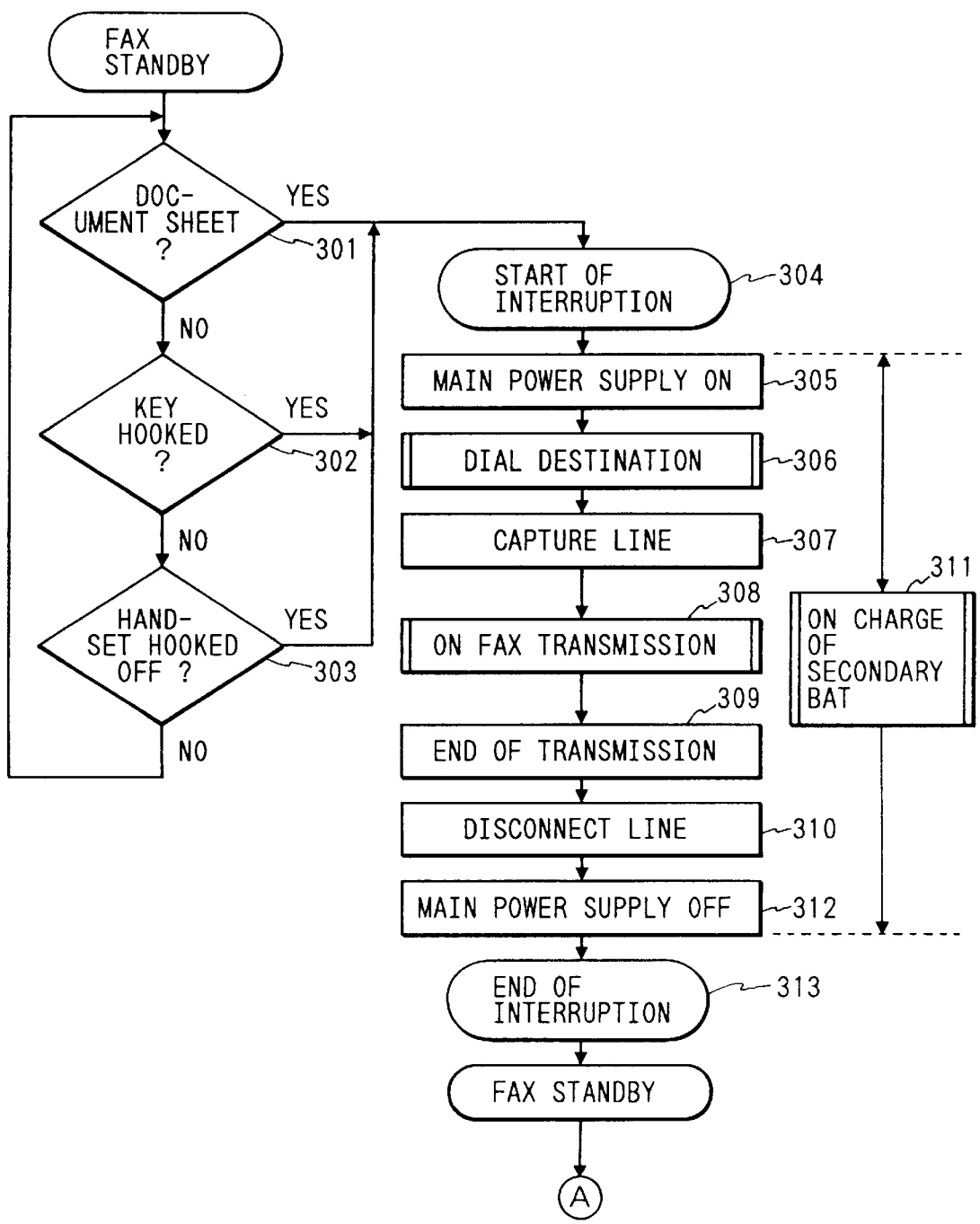
FIG. 12 is a flow chart showing a transmission interruption routine in the standby state of the facsimile apparatus.

FIG. 12 shows a FAX transmission interruption routine in the FAX standby state. When a document sheet is detected in the FAX standby state (step 301), when a hooking button is depressed (step 302), or when the handset is hooked off (step 303), a corresponding one of the switches 61, 60, and 65 is turned on, and its ON signal is supplied to the CPU 102 via the delay circuit 68. Also, the ON signal turns on the photo-coupler 45 as the signal PS via the ICs 33, 32, and 34, and resets the microcomputer 17. Thus, this interruption operation is started (step 304).

When the photo-coupler 45 is turned on, the IC 44 oscillates the primary side via the FET 43 to supply electric power to the secondary side. Thus, the main power supply 116 is started (step 305). While the main power supply 116 is active, the secondary battery 19 is always charged (step 311). In this state, when a call is made to a destination facsimile apparatus (step 306), and a line is captured (step 307), it is ready to perform normal facsimile transmission (step 308). When transmission ends (step 309) and the line is disconnected (step 310), a signal to be input from the port OUT1 of the CPU 102 to the port IN3 of the microcomputer 17 goes from High level to low level, and the microcomputer 17 resets the CPU 102 accordingly and sets the signal PS at Low level to stop the operation of the main power supply 116 (step 312). Upon completion of this interruption (step 313), the FAX standby state is set, and the flow returns to a connector A in FIG. 11.

Figure 13:
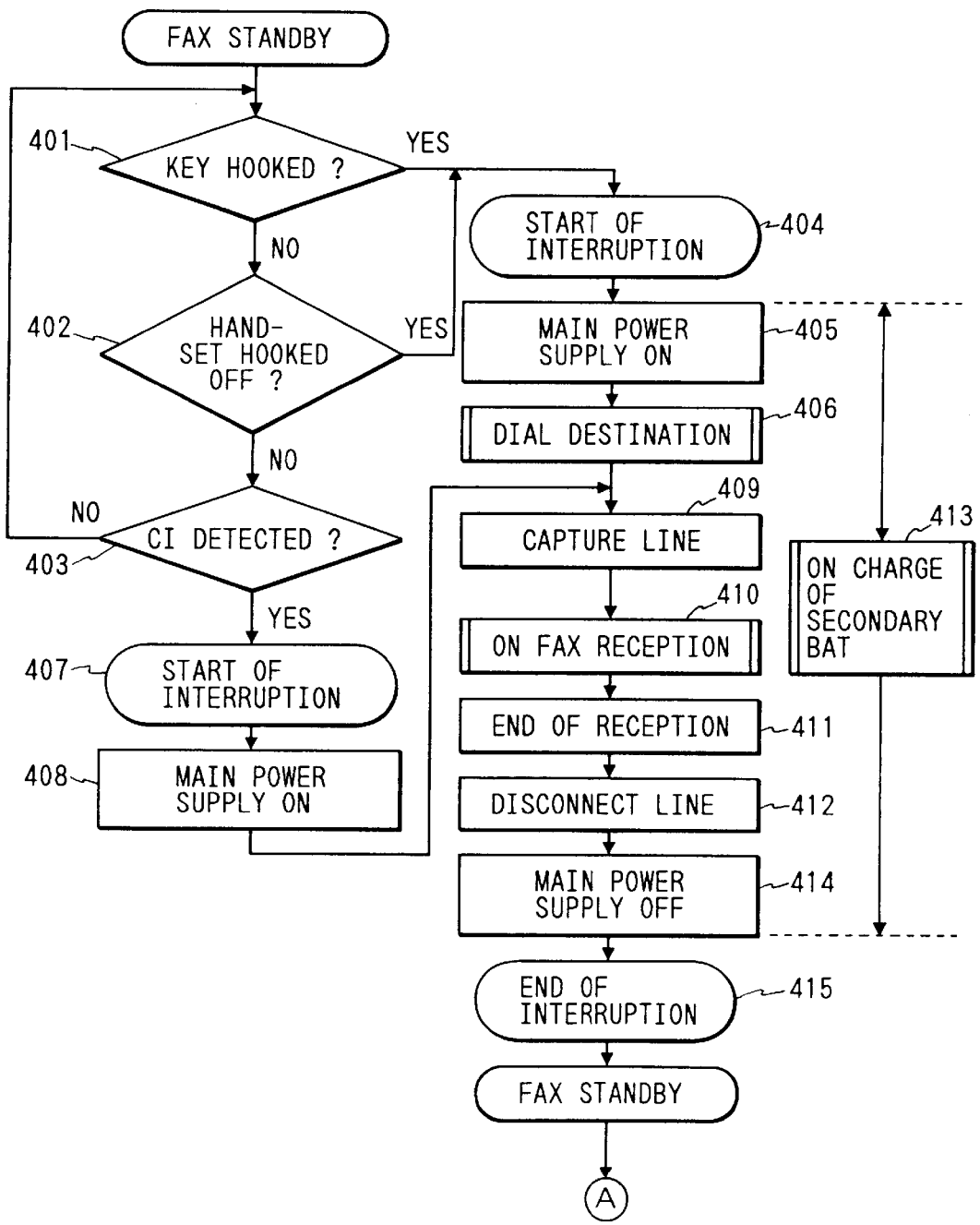
FIG. 13 is a flow chart showing a reception interruption routine in the standby state of the facsimile apparatus.

FIG. 13 shows a FAX reception interruption routine in the FAX standby state. When the hooking button is depressed in the FAX standby state (step 401), or when the handset is hooked off (step 402), a corresponding one of the switches 60 and 65 is turned on, and its ON signal is input to the CPU 102 via the delay circuit 68. Also, the ON signal turns on the photo-coupler 45 as the signal PS via the ICs 33, 32, and 34, and resets the microcomputer 17. Thus, this interruption operation is started (step 404).

When the photo-coupler 45 is turned on, the IC 44 oscillates the primary side of the transformer 39 via the FET 43, thereby supplying electric power to the secondary side. Thus, the main power supply 116 is started (step 405). On the other hand, when a ringing signal (CI) is detected (step 403), the switch 64 is turned on, and its ON signal is supplied to the CPU 102 via the delay circuit 68. Also, the ON signal similarly turns on the photo-coupler 45 as the signal PS via the ICs 33, 32, and 34, and resets the microcomputer 17. Thus, this interruption operation is started (step 407). When the photo-coupler 45 is turned on, the IC 44 oscillates the primary side of the transformer 39 via the FET 43, thereby supplying electric power to the secondary side. Thus, the main power supply 116 is started (step 408). In either case, while the main power supply 116 is active, the secondary battery 19 is always charged (step 413).

When the hooking button is depressed or when the handset is hooked off, a call is made to a destination facsimile (step 406), and when a line is captured (step 409), normal facsimile reception is performed (step 410). When a ringing signal is detected, the NCU 110 captures the line, and performs facsimile reception in an auto-receive mode.

Upon completion of reception (step 411), when the line is disconnected (step 412), a signal to be input from the port OUT1 of the CPU 102 to the port IN3 of the microcomputer 17 goes from High level to Low level. In accordance with this signal, the microcomputer 17 resets the CPU 102, and sets the signal PS at Low level to stop the operation of the main power supply 116 (step 414). Upon completion of this interruption operation (step 415), the FAX standby state is set, and the flow returns to the connector A in FIG. 11.

The respective states of the facsimile apparatus using the main power supply 116 with the arrangement shown in FIG. 6 have been described. In the second embodiment, since the main power supply 116 comprises the delay circuit 35, when an AC input is started, the main power supply 116 is started, and after an elapse of a predetermined period of time, the main power supply 116 stops its operation. For this reason, the main power supply control unit 115 need not continuously output a control signal for stopping the main power supply 116 in the standby state, and consumption of the secondary battery 19 can be suppressed, thus achieving low power consumption.

When an AC input is started, since the main power supply 116 is started, the main power supply control unit 115 can supply a control signal for starting the main power supply to the main power supply 116 even when the secondary battery 19 is fully discharged. Furthermore, the delay circuit 35 can be realized with low cost since it is simply constituted by a resistor and a capacitor.

As described above, according to the second embodiment, the switching operation of the primary side of the output transformer can be controlled by an external signal, and the delay circuit is arranged, so that the primary side of the output transformer automatically oscillates for a predetermined period of time when power supply is started. For this reason, a stop signal of the main power supply need not be kept output in the standby state, and low power consumption can be attained. In addition, even when the secondary battery is fully discharged, the main power supply can be started.

(Third Embodiment)

Figure 14:
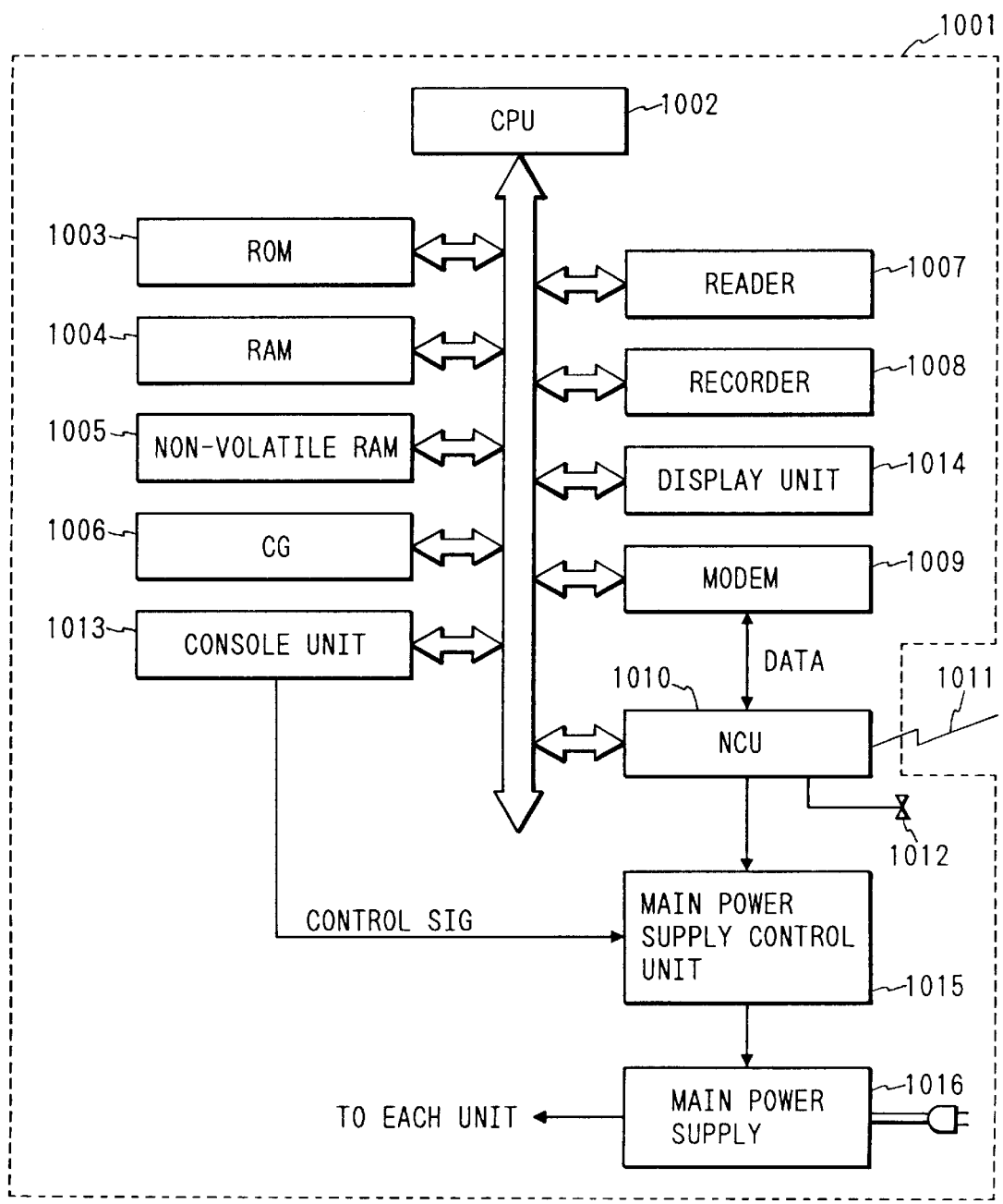
FIG. 14 is a block diagram showing the arrangement according to the third embodiment of the present invention.

FIG. 14 is a block diagram showing the arrangement according to the third embodiment. Referring to FIG. 14, an apparatus main body 1001 of this facsimile apparatus includes a CPU (central processing unit) 1002 comprising, e.g., a microprocessor. The CPU 1002 controls the system of the entire apparatus in accordance with a program stored in a ROM 1003, i.e., controls a RAM 1004 which can read/write data, a non-volatile RAM 1005, a character generator (CG) 1006, a document reader 1007, a recorder 1008, a modem 1009, a network control unit (NCU) 1010, a console unit 1013, and a display unit 1014.

The RAM 1004 stores binary image data read by the reader 1007 or binary image data to be recorded by the recorder 1008. Binary image data stored in the RAM 1004 is modulated by the modem 1009, and the modulated data is output onto a telephone line 1011 via the NCU 1010. Also, an analog waveform signal input from the telephone line 1011 is demodulated via the NCU 1010 and the modem 1009 to obtain binary image data, and the demodulated binary image data is also stored in the RAM 1004.

The non-volatile RAM 1005 reliably stores data to be preserved such as abbreviated dial number data even after the power supply of the apparatus main body 1001 is shut down. The ROM 1003 stores character data such as JIS code, ASCII codes, and the like, and outputs 2-byte character data corresponding to a predetermined code under the control of the CPU 1002.

The reader 1007 comprises a DMA controller, an image processing IC, an image sensor, a CMOS logic IC, and the like. The reader 1007 binarizes data read by utilizing a contact sensor (CS) and sequentially supplies the binary data to the RAM 1004 under the control of the CPU 1002. The set state of a document sheet on the reader 1007 can be detected by a mechanical document detect sensor arranged in a convey path of a document sheet, and a document detect signal from the sensor is input to a main power supply control unit 1015 for controlling a main power supply 1016 and to the CPU 1002.

The recorder 1008 comprises a DMA controller, an ink-jet recording device, a CMOS logic IC, and the like. The recorder reads out recording data stored in the RAM 1004 and records the readout data as a hard copy under the control of the CPU 1002. The modem 1009 comprises G3 and G2 modems, a clock generator connected to these modems, and the like. The modem 1009 modulates transmission data stored in the RAM 1004 and outputs the modulated data onto the telephone line 1011 via the NCU 1010 under the control of the CPU 1002. Also, the modem 1009 receives an analog signal on the telephone line 1011 via the NCU 1010, and stores binary data, obtained by demodulating the analog signal, in the RAM 1004.

The NCU 1010 selectively switches the telephone line 1011 to the modem 1009 or a telephone set 1012 under the control of the CPU 1002. The NCU 1010 has a detect means for detecting a ringing signal (CI). Upon detection of the ringing signal, the NCU 1010 supplies an incoming call signal to the main power supply control unit 1015 and the CPU 1002.

The telephone set 1012 is integrated with the apparatus main body 1001, and comprises a handset, a speech network, a dialer, a ten-key pad or one-touch keys, and the like. The console unit 1013 comprises a start key for starting image transmission, reception, and the like, a mode selection key for designating an operation mode such as a "fine" mode, a "standard" mode, an "auto-receive" mode, and the like in transmission/reception, a ten-key pad or one-touch keys for dialing, and the like. When one of these keys is depressed, an ON signal of the corresponding key is supplied to the main power supply control unit 1015 and the CPU 1002.

The display unit 1014 comprises a liquid crystal display for performing a 16-digit display, and displays predetermined characters and the like under the control of the CPU 1002. The main power supply control unit 1015 controls energization (power supply) to the respective units of the apparatus main body 1001, and comprises a one-chip microcomputer, a capacitor-type secondary battery, and the like. The main power supply control unit 1015 can be driven by only electric power supplied from the secondary battery. The main power supply control unit 1015 outputs a start signal to start the main power supply 1016 upon reception of a document detect signal from the reader 1007, an incoming call signal from the NCU 1010, or an ON signal from the console unit 1013. The main power supply 1016 comprises an AC-input switching power supply, and its switching operation can be externally ON/OFF-controlled. The main power supply 1016 starts or stops power supply in accordance with the start or stop signal from the main power supply control unit 1015.

Figure 15:
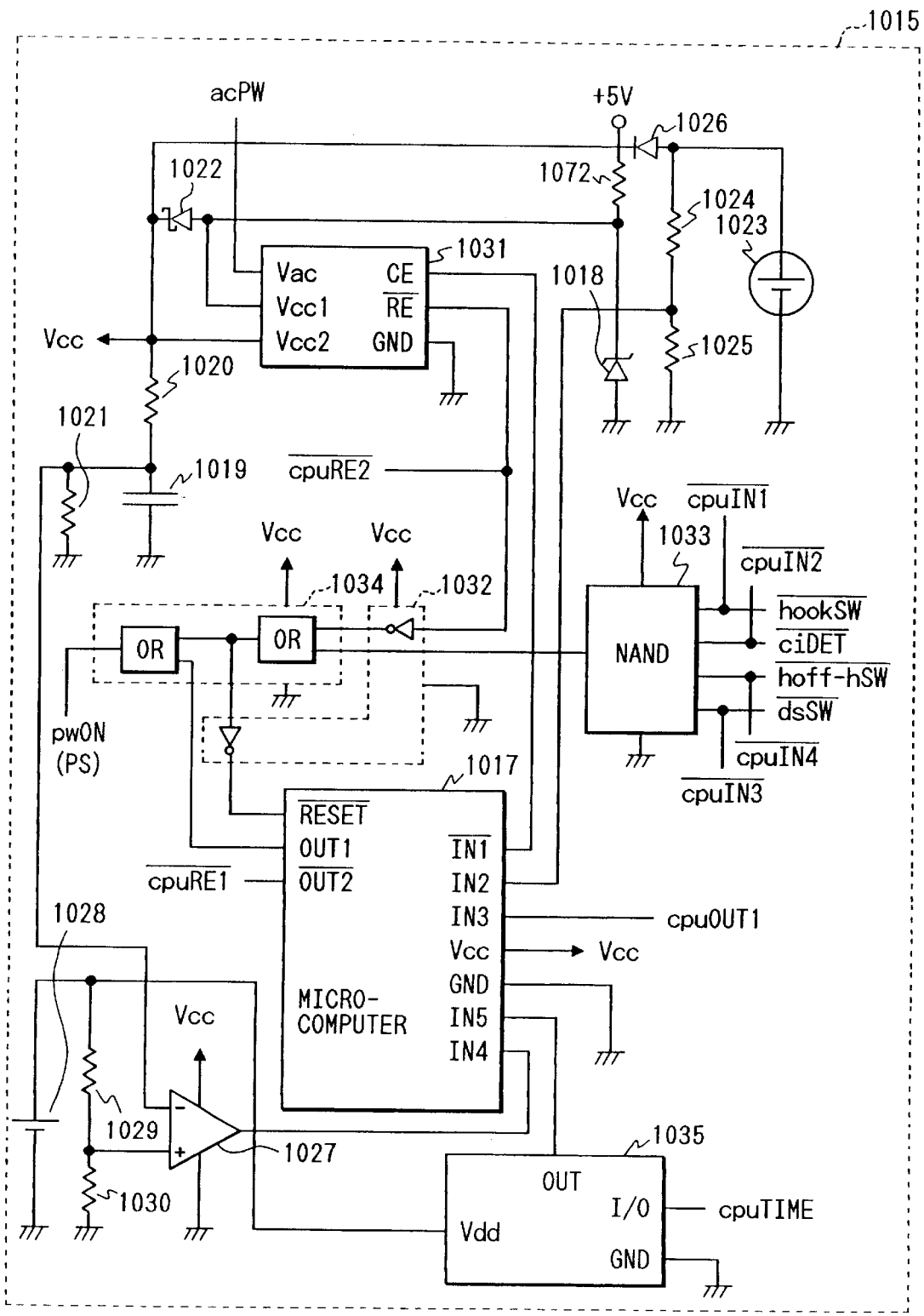
FIG. 15 is a circuit diagram showing the internal arrangement of a main power supply control unit.
Figure 16:
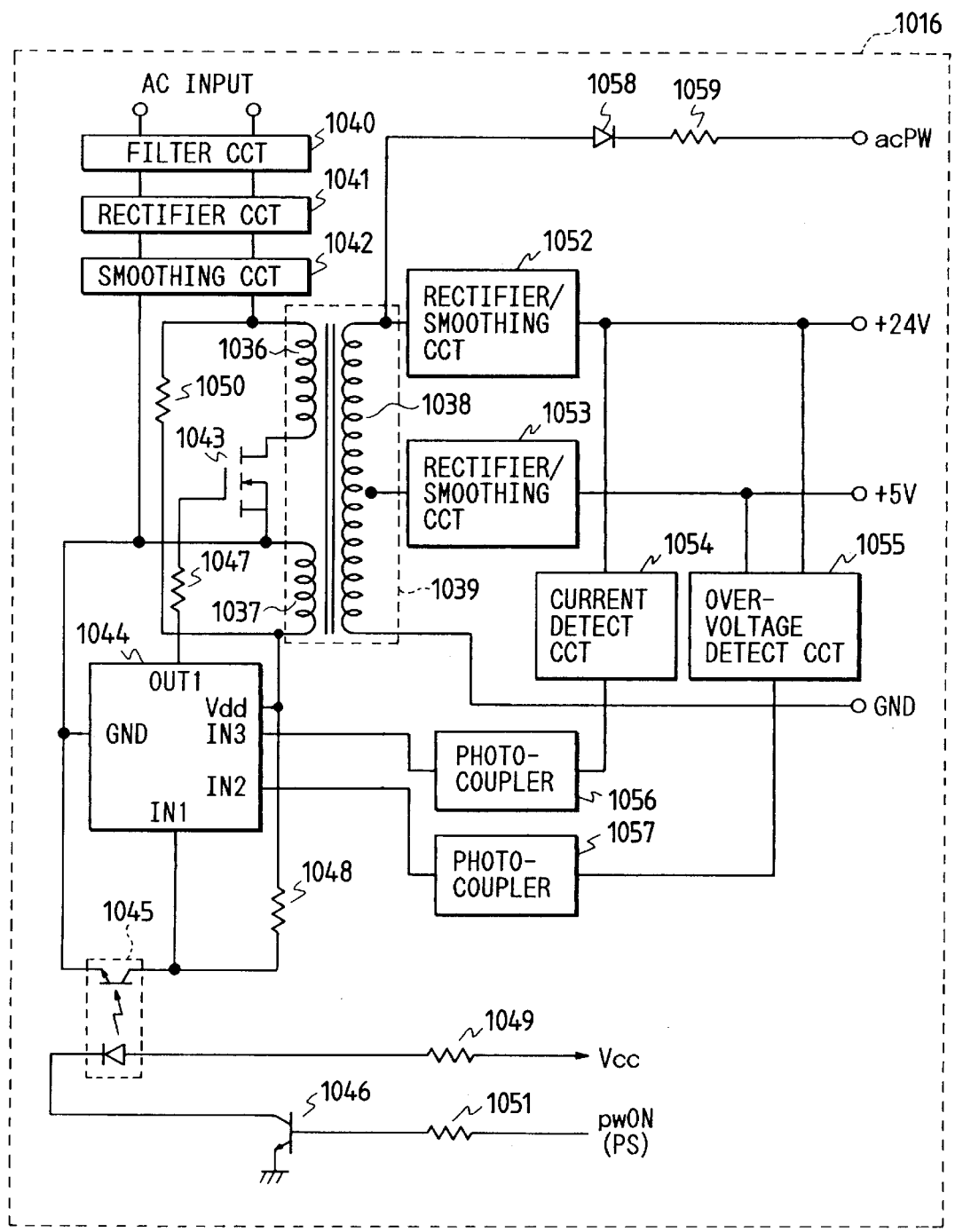
FIG. 16 is a circuit diagram showing the internal arrangement of a main power supply.
Figure 17A:
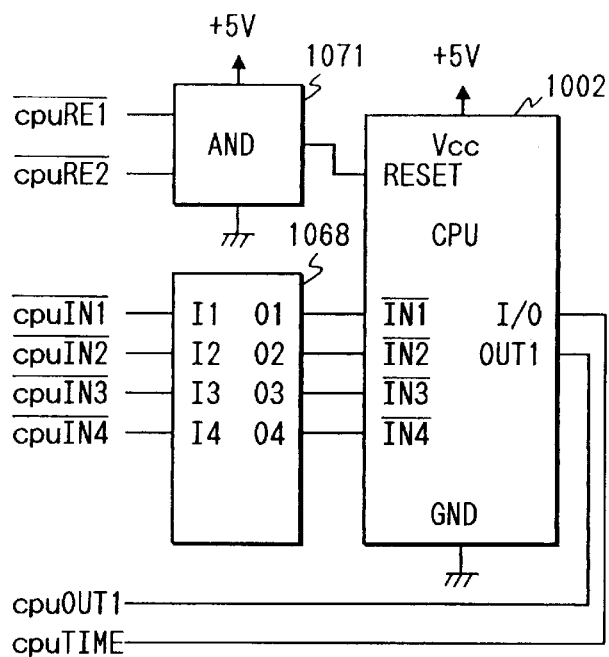
FIGS. 17A to 17C are circuit diagrams showing the circuit arrangements of the respective units shown in FIG. 14.
Figure 17B:
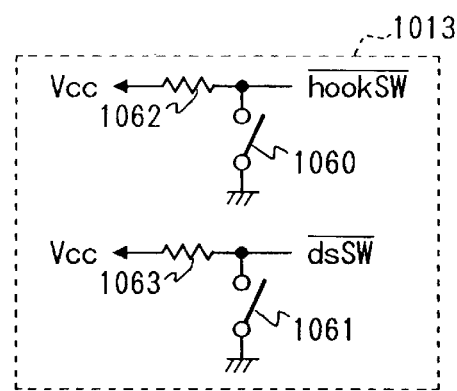
Figure 17C:
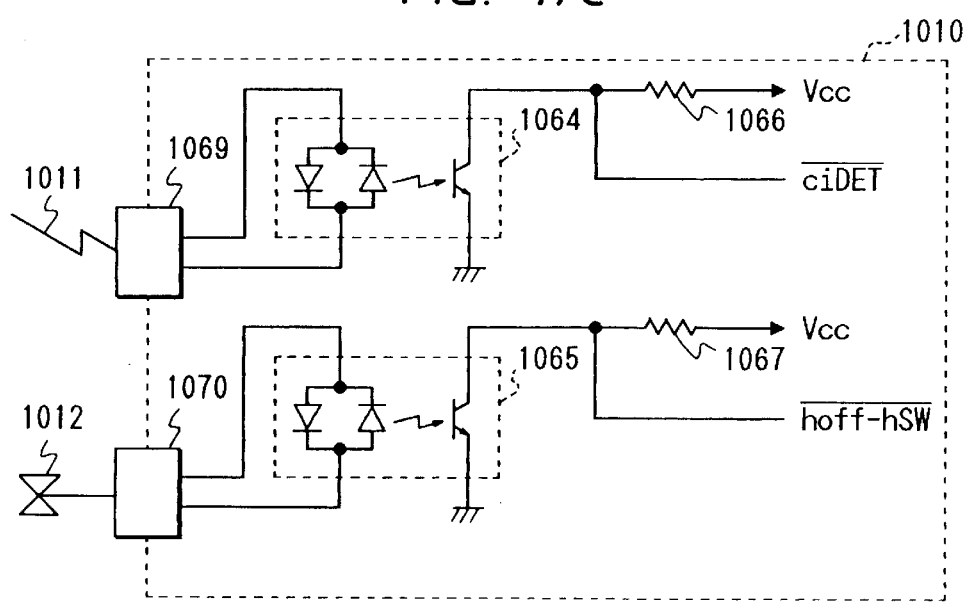

FIG. 15 is a circuit diagram showing the internal arrangement of the main power supply control unit 1015, FIG. 16 is a circuit diagram showing the internal arrangement of the main power supply 1016, and FIGS. 17A to 17C are circuit diagrams showing the circuit arrangements of various switch units and peripheral circuits of the CPU 1002 in the apparatus main body 1001.

Referring to FIGS. 15 to 17C, a power supply line Vcc connects three different power supply sources, i.e., a +5 V line from the main power supply 1016, a solar cell 1023, and the above-mentioned capacitor-type secondary battery 1019. The priority levels of these three power supplies are determined by their voltages, a reverse-flow prevention Schottky barrier diode 1022, and a reverse-flow prevention diode 1026, and a voltage from the main power supply 1016 is set to be about 4.8 V by a Zener diode 1018 and the Schottky barrier diode 1022, a voltage from the solar cell 1023 is set to be 4.6 V, and a voltage from the secondary battery 1019 is set to be 4.5 V (when fully charged).

When the main power supply 1016 is set up, this power supply has the highest priority due to the directions of the diodes 1022 and 1026, and the main power supply 1016 charges the secondary battery 1019 and supplies electric power onto the line Vcc. At this time, the solar cell 1023 is set at a low potential, and does not supply any current. When the main power supply 1016 is not in operation, and the solar cell 1023 is supplying electric power, i.e., when light energy is being supplied although the main power supply 1016 is not in operation, if the potential of the secondary battery 1019 is higher than that of the solar cell 1023, electric power is supplied from the secondary battery 1019 onto the line Vcc, and is not supplied from the solar cell 1023. When the potential of the secondary battery 1019 is lower than that of the solar cell 1023, the solar cell 1023 supplies electric power onto the line Vcc, and at the same time, charges the secondary battery 1019 via a resistor 1020. When neither the main power supply 1016 nor the solar cell 1023 are in operation, the secondary battery 1019 supplies electric power onto the line Vcc.

Referring to FIG. 15, a 4-bit one-chip microcomputer 1017 can operate with ultra-low power consumption, and comprises an internal timer means. Whether or not the solar cell 1023 supplies electric power is determined by voltage-dividing the potential of the solar cell 1023 by resistors 1024 and 1025, and inputting the voltage-divided value to an input port IN2 of the microcomputer 1017. The voltage from the secondary battery 1019 is detected by comparing it with the voltage from a primary battery 1028 for backing up the RAM 1005 by a comparator 1027 via a voltage stabilization resistor 1021. The output from the comparator 1027 is supplied to an input port IN4 of the microcomputer 1017. Note that resistors 1029 and 1030 are used for voltage-dividing the voltage from the primary battery 1028.

An IC 1031 compares a voltage Vac at the secondary side of the main power supply 1016, a voltage Vcc1 of +5 V from the main power supply 1016, and a voltage Vcc2 from the secondary battery 1019. When the voltage Vcc1 becomes higher than 2 V, the CE output port of the IC 1031 goes to High level. When the voltage Vac becomes equal to or lower than about 2 V, the CE output port goes to Low level. The output from the CE output port is supplied to an input port IN1 of the microcomputer 1017. When the voltage Vcc2 becomes equal to or lower than 3 V, the RE output port of the IC 1031 goes from High level to Low level, and a reset signal is kept output. When the voltage Vcc2 becomes higher than 3 V, the RE output port is kept at High level. The output from the RE output port is supplied to the RESET port of the microcomputer 1017 via an inverter IC 1032 and an OR gate IC 1034. This output is also supplied to the RESET port of the CPU 1002 via an AND gate IC 1071 (FIG. 17A).

A NAND gate IC 1033 receives a signal from a hooking switch 1060, a mechanical document detect switch (or read switch) 1061 (FIG. 17B), a ringing signal detect switch (photo-coupler) 1064, or an off-hook detect switch (photo-coupler) 1065 for the handset (FIG. 17C). The output from the IC 1033 is supplied to the RESET port of the microcomputer 1017 via the IC 1034. Note that voltage adjustment resistors 1062, 1063, 1066, and 1067 in FIGS. 17B and 17C are respectively connected to the switches 1060, 1061, 1064, and 1065, and modular jacks 1069 and 1070 in FIG. 17C are respectively connected to the switches 1064 and 1065.

A timepiece circuit 1035 can set time, and comprises an RTC (Real-Time Clock; the name of clock generating means). The timepiece circuit 1035 can exchange signals with the CPU 1002 or the microcomputer 1017, and outputs a scheduled time signal to the microcomputer 1017 at a given setting time.

When an input port IN3 of the microcomputer 1017 is at High level, it indicates that the CPU 1002 is active. The output from an output port OUT1 of the microcomputer 1017 is supplied to the main power supply 1016 via the IC 1034. An output port OUT2 of the microcomputer 1017 outputs a reset signal to the CPU 1002 via the AND gate IC 1071. Note that a resistor 1072 is used for adjusting a voltage.

Referring to FIG. 16, an AC input is supplied to an insulating transformer 1039 having primary and secondary windings 1036 and 1038 via a filter circuit 1040, a rectifier circuit 1041, and a smoothing circuit 1042, and is switched by an FET 1043. An IC 1044 performs oscillation control at the primary side of the transformer 1039, and its power supply voltage Vdd is supplied from an auxiliary winding 1037 wound in the transformer 1039. The secondary side of the transformer 1039 supplies power supply voltages of +24 V and +5 V from the winding 1038 to the respective units in the apparatus main body 1001 via rectifier/smoothing circuits 1052 and 1053.

A current detect circuit 1054 and an overvoltage detect circuit 1055 feed back their outputs to the IC 1044 via photo-couplers 1056 and 1057, respectively. The IC 1044 performs PWM control based on a current at the secondary side, and when an overvoltage is detected, the IC 1044 shuts down the entire system.

A signal PS as a signal to be used in the third embodiment is supplied to the IC 1044 via a photo-coupler 1045. When the signal PS is at High level, a transistor 1046 is enabled, and a current is supplied to the photo-coupler 1045. Then, the photo-coupler 1045 performs current-voltage conversion, and the input port IN1 of the IC 1044 goes to Low level. The output port OUT1 of the IC 1044 oscillates accordingly, and the primary side of the transformer 1039 oscillates via the FET 1043 and supplies electric power to the secondary side. Thus, the main power supply 1016 is set up, and starts its operation. When the signal PS is at Low level, the transistor 1046 is disabled, and the input port IN1 of the IC 1044 goes to High level. The output port OUT1 of the IC 1044 goes to Low level accordingly, and the FET 1043 is disabled. Thus, oscillation at the primary side of the transformer 1039 is stopped, and the main power supply 1016 stops its operation. The power supply device also includes current limiting resistors 1047, 1048, 1049, 1050, and 1051, a reverse-flow prevention diode 1058, and a current limiting resistor 1059. Note that the photo-coupler 1045 also performs insulation between the primary and secondary sides.

FIGS. 17A to 17C show the circuit arrangements of the respective units in FIG. 14. FIG. 17A shows the peripheral circuits of the CPU 1002, FIG. 17B shows the internal arrangement of the console unit 1013, and FIG. 17C shows the internal arrangement of the NCU 1010. Referring to FIGS. 17A to 17C, a delay circuit 1068 is constituted by a resistor and a capacitor, delays signals input to its input ports I1 to I4 by a time required for initialization of the CPU 1002, and outputs the delayed signals from output ports O1 to O4, respectively.

FIGS. 18 to 21 are flow charts showing the operation of this embodiment. The operation of this embodiment will be described below with reference to FIGS. 18 to 21.

Figure 18:
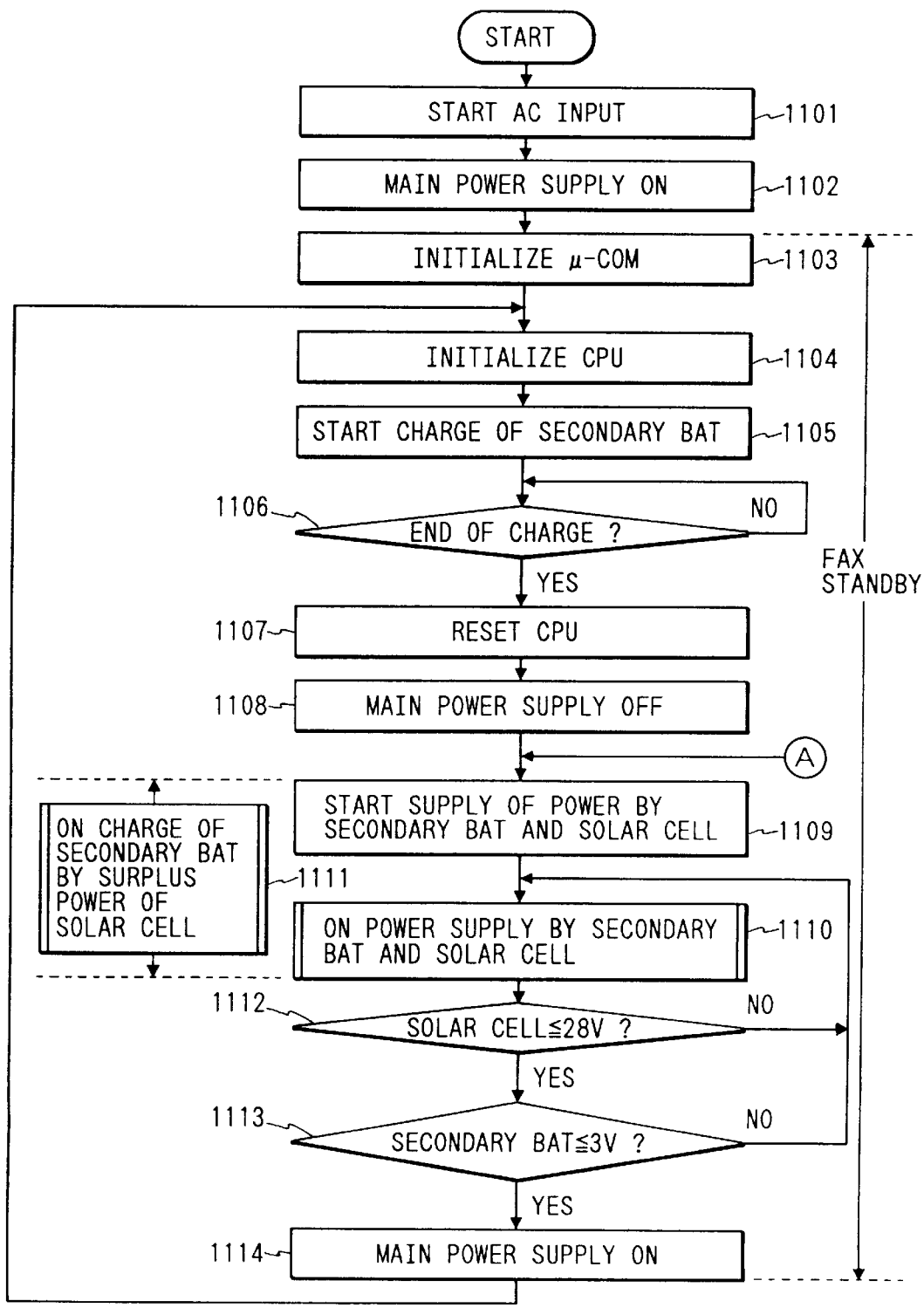
FIG. 18 is a flow chart showing the operation in a standby state.

FIG. 18 is a flow chart showing the operation in a FAX standby state. When an AC input is started (step 1101), the main power supply 1016 is turned on and started (step 1102) to initialize the microcomputer 1017 (step 1103), to initialize the CPU 1002 (step 1104), and at the same time, to start charging of the secondary battery 1019 (step 1105). Upon completion of initialization of the microcomputer 1017, the facsimile apparatus is set in a standby state, and while this standby state continues, the secondary battery 1019 is kept charged.

Upon completion of charging of the secondary battery 1019 (step 1106), i.e., when the output from the comparator 1027 goes to High level or when the internal timer of the microcomputer 1017 has measured one hour, the main power supply 1016 stops. At this time, in the former case, since the port IN4 of the microcomputer 1017 goes to High level, the microcomputer 1017 resets the CPU 1002 accordingly (step 1107), and stops the operation of the main power supply 1016 (step 1108). Then, power supply only by the secondary battery 1019 and the solar cell 1023 is started (step 1109). Similarly, in the latter case, the microcomputer 1017 resets the CPU 1002 according to the contents of the internal timer, and stops the operation of the main power supply 1016. Then, power supply only by the secondary battery 1019 and the solar cell 1023 is started (step 1110). In either case, the secondary battery 1019 is charged by surplus power of electric power supplied from the solar cell 1023 (step 1111).

When electric power supplied from the solar cell 1023 decreases, and its voltage becomes equal to or lower than 2.8 V (step 1112), the secondary battery 1019 begins to discharge. When the voltage from the secondary battery 1019 becomes equal to or lower than 3 V (step 1113), the RE output port of the IC 1031 goes to Low level, and the above-mentioned signal PS goes to High level. Therefore, the photo-coupler 1045 is turned on, and the port IN1 of the IC 1044 goes to Low level. According to the output from the port IN1, the port OUT1 of the IC 1044 oscillates, and the primary side of the transformer 1039 oscillates via the FET 1043, thus supplying electric power to the secondary side. Thus, the main power supply 1016 is started (step 1114). During this operation, the CPU 1002 is initialized, and charging of the secondary battery 1019 is started. In this manner, the secondary battery 1019 is charged again while maintaining the FAX standby state. Then, this cycle is repeated.

Figure 19:
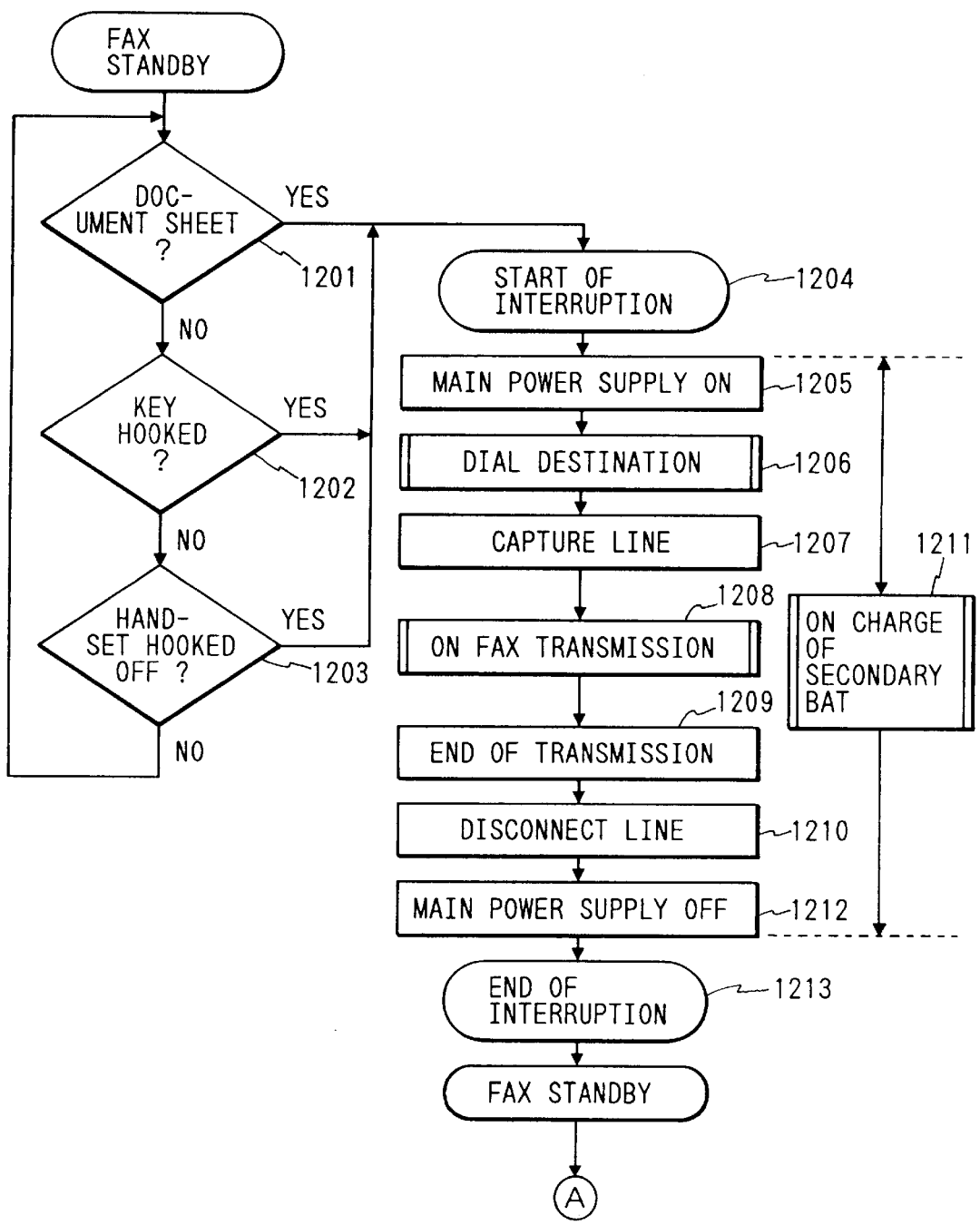
FIG. 19 is a flow chart showing a transmission interruption routine in the standby state.

FIG. 19 shows a FAX transmission interruption routine in the FAX standby state. When a document sheet is detected in the FAX standby state (step 1201), when a hooking button is depressed (step 1202), or when the handset is hooked off (step 1203), a corresponding one of the switches 1061, 1060, and 1065 is turned on, and its ON signal is supplied to the CPU 1002 via the delay circuit 1068. Also, the ON signal turns on the photo-coupler 1045 as the signal PS via the ICs 1033, 1032, and 1034, and resets the microcomputer 1017. Thus, this interruption operation is started (step 1204).

When the photo-coupler 1045 is turned on, the IC 1044 oscillates the primary side via the FET 1043 to supply electric power to the secondary side. Thus, the main power supply 1016 is started (step 1205). While the main power supply 1016 is active, the secondary battery 1019 is always charged (step 1211). In this state, when a call is made to a destination facsimile apparatus (step 1206), and a line is captured (step 1207), it is ready to perform normal facsimile transmission (step 1208). When transmission ends (step 1209) and the line is disconnected (step 1210), a signal to be input from the port OUT1 of the CPU 1002 to the port IN3 of the microcomputer 1017 goes from High level to low level, and the microcomputer 1017 resets the CPU 1002 accordingly and sets the signal PS at Low level to stop the operation of the main power supply 1016 (step 1212). Upon completion of this interruption (step 1213), the FAX standby state is set, and the flow returns to a connector A in FIG. 18.

Figure 20:
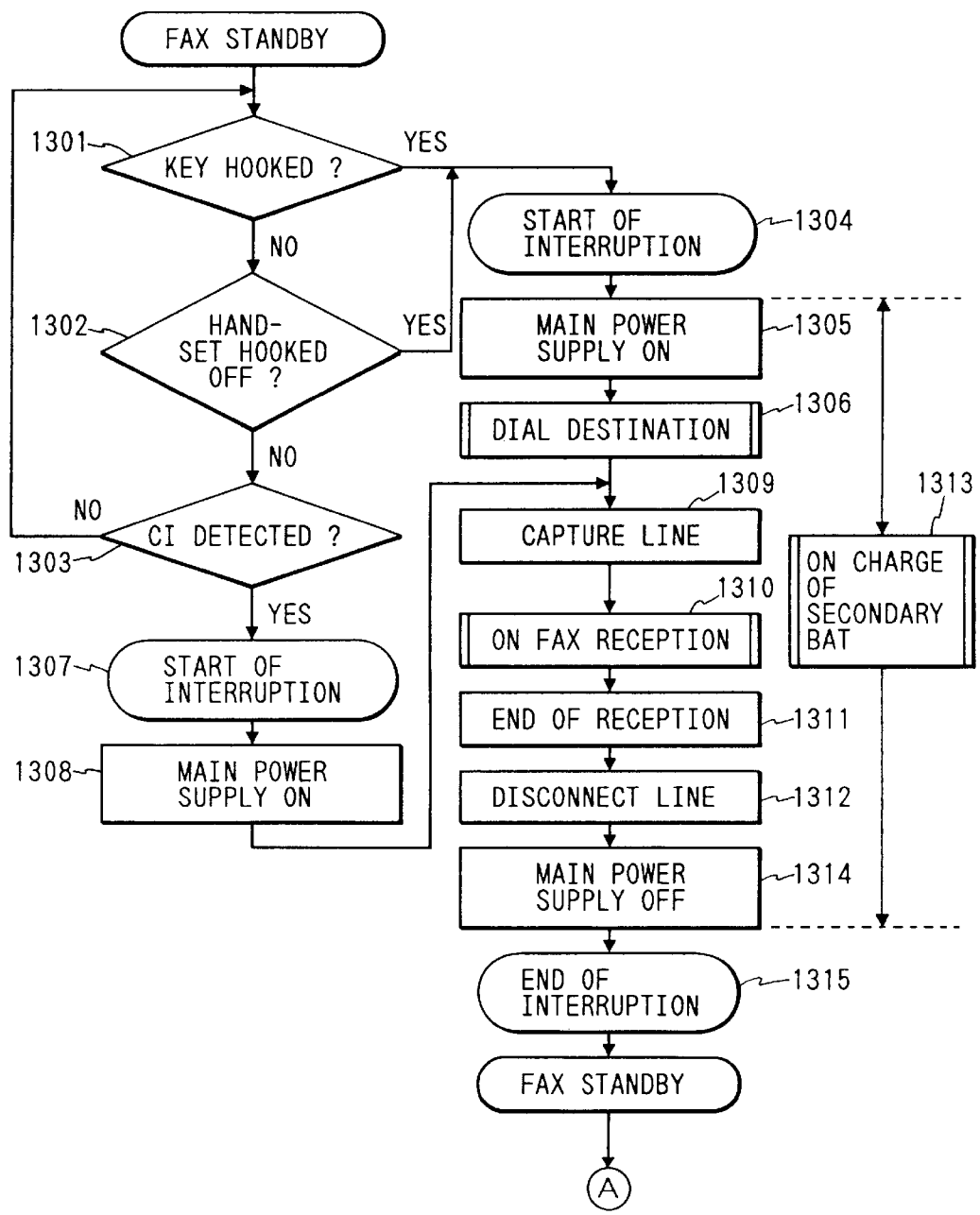
FIG. 20 is a flow chart showing a reception interruption routine in the standby state.

FIG. 20 shows a FAX reception interruption routine in the FAX standby state. When the hooking button is depressed in the FAX standby state (step 1301), or when the handset is hooked off (step 1302), a corresponding one of the switches 1060 and 1065 is turned on, and its ON signal is input to the CPU 1002 via the delay circuit 1068. Also, the ON signal turns on the photo-coupler 1045 as the signal PS via the ICs 1033, 1032, and 1034, and resets the microcomputer 1017. Thus, this interruption operation is started (step 1304).

When the photo-coupler 1045 is turned on, the IC 1044 oscillates the primary side of the transformer 1039 via the FET 1043, thereby supplying electric power to the secondary side. Thus, the main power supply 1016 is started (step 1305). On the other hand, when a ringing signal (CI) is detected (step 1303), the switch 1064 is turned on, and its ON signal is supplied to the CPU 1002 via the delay circuit 1068. Also, the ON signal similarly turns on the photo-coupler 1045 as the signal PS via the ICs 1033, 1032, and 1034, and resets the microcomputer 1017. Thus, this interruption operation is started (step 1307). When the photo-coupler 1045 is turned on, the IC 1044 oscillates the primary side of the transformer 1039 via the FET 1043, thereby supplying electric power to the secondary side. Thus, the main power supply 1016 is started (step 1308). In either case, while the main power supply 1016 is active, the secondary battery 1019 is always charged (step 1313).

When the hooking button is depressed or when the handset is hooked off, a call is made to a destination facsimile (step 1306), and when a line is captured (step 1309), normal facsimile reception is performed (step 1310). When a ringing signal is detected, the NCU 1010 captures the line, and performs facsimile reception in an auto-receive mode.

Upon completion of reception (step 1311), when the line is disconnected (step 1312), a signal to be input from the port OUT1 of the CPU 1002 to the port IN3 of the microcomputer 1017 goes from High level to Low level. In accordance with this signal, the microcomputer 1017 resets the CPU 1002, and sets the signal PS at Low level to stop the operation of the main power supply 1016 (step 1314). Upon completion of this interruption operation (step 1315), the FAX standby state is set, and the flow returns to the connector A in FIG. 18.

Figure 21:
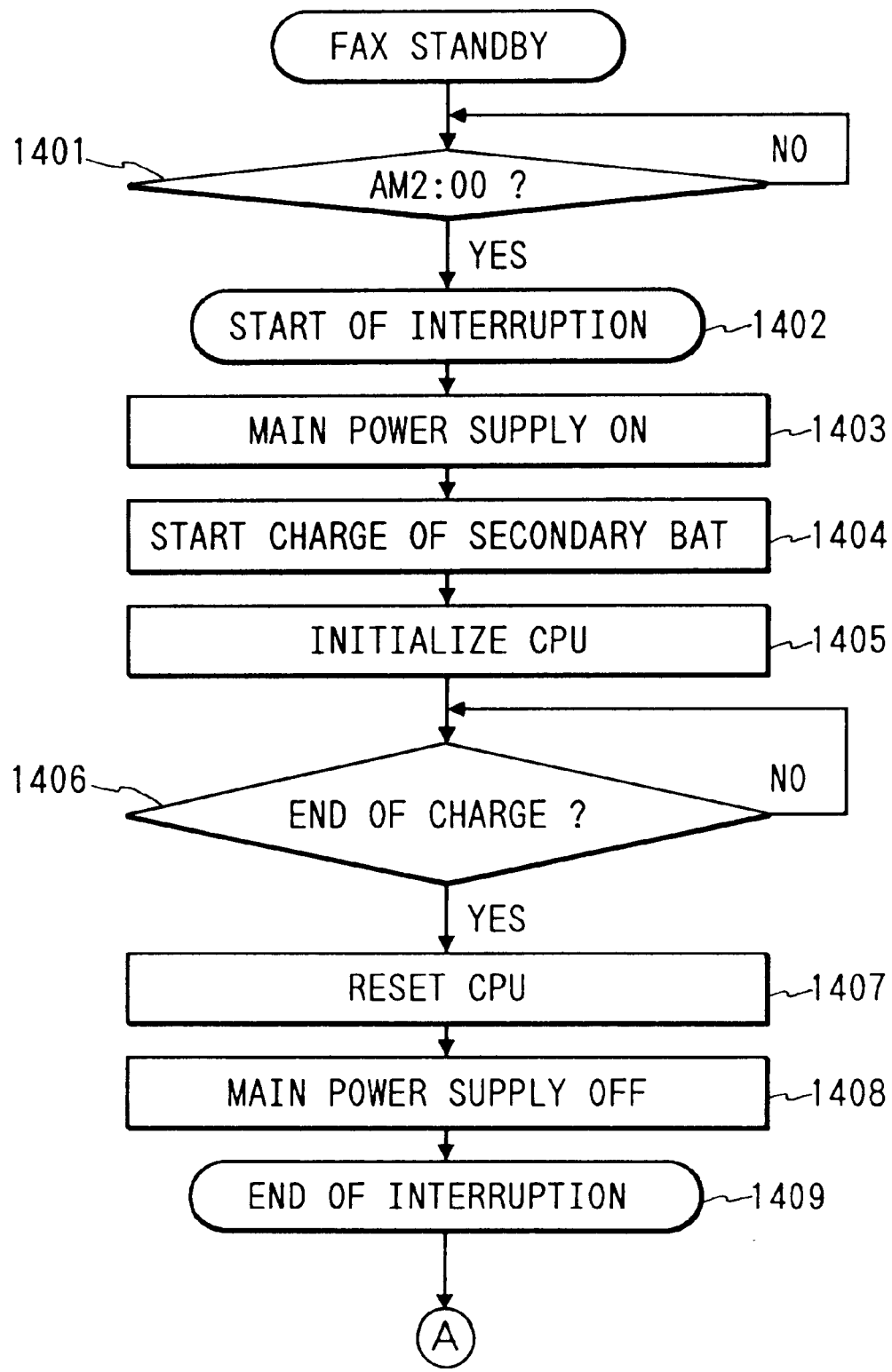
FIG. 21 is a flow chart showing a mid-night charging interruption routine in the standby state.

FIG. 21 shows a mid-night charging interruption routine in the FAX standby state. In the FAX standby state, at the time pre-set by a timepiece circuit 1035 in FIG. 15, e.g., at 2:00 a.m. (mid-night) (step 1401), a port OUT of the timepiece circuit 1035 goes from Low level to High level, and a port IN5 of the microcomputer 1017 goes from Low level to High level, thus starting this interruption operation (step 1402).

The port OUT1 of the microcomputer 1017 then goes to High level, the signal PS goes to High level, and the photo-coupler 1045 is turned on. Thus, the port OUT1 of the IC 1044 oscillates, and the primary side of the transformer 1039 oscillates via the FET 1043, thus supplying electric power to the secondary side. Then, the main power supply 1016 is started (step 1403). At this time, charging of the secondary battery 1019 is started (step 1404), and the CPU 1002 is initialized (step 1405). During this interval, the FAX standby state is maintained.

When charging of the secondary battery 1019 is completed while the above-mentioned standby state is maintained (step 1406), i.e., when the output from the comparator 1027 goes to High level or when the internal timer of the microcomputer 1017 has measured one hour, the CPU 1002 is reset (step 1407), and the main power supply 1016 is turned off (step 1408). In the former case, since the port IN4 of the microcomputer 1017 goes to High level, the microcomputer 1017 resets the CPU 1002 accordingly, and stops the operation of the main power supply 1016. Thus, power supply by only the secondary battery 1019 and the solar cell 1023 is started. In the latter case, the microcomputer 1017 resets the CPU 1002 according to the contents of its internal timer, and stops the operation of the main power supply 1016. Thus, power supply by only the secondary battery 1019 and the solar cell 1023 is started. This interruption operation ends (step 1409), and the flow returns to the connector A in FIG. 18.

The operations in the respective states of the apparatus of this embodiment have been described. Since the third embodiment comprises the main power supply control unit 1015 for controlling energization to the respective units in the apparatus main body 1001, the main power supply 1016 for supplying electric power to the main power supply control unit 1015, the secondary battery 1019, and the solar cell 1023 (if necessary) so as to control power supply operations, the power consumption in the standby state can be set to be almost 0 W, as described above.

Therefore, since electric power can be prevented from being consumed all day long for an auto-receive function, electric power loss is minimized, and generation of radiation noise can be prevented. Since the primary side of the main power supply 1016 is not directly controlled by a plurality of means, this embodiment can be easily practiced independently of limitations associated with the safety standards.

Furthermore, since this embodiment comprises the timepiece circuit, the main power supply 1016 can be set up at a given setting time in, e.g., the mid-night to charge the secondary battery 1019. For this reason, a user need not be concerned with the set-up operation of the main power supply 1016, and the secondary battery 1019 can be charged in a time zone with less power consumption amount.

As described above, the third embodiment comprises the main power supply for supplying electric power to the respective units of the apparatus main body, the main power supply control unit for controlling the main power supply, the secondary battery and the solar cell for supplying electric power to the main power supply control unit, and the timepiece circuit which can set a time, so that the main power supply can be started in response to a ringing signal from the telephone line, an ON signal from an external switch means, or a scheduled time signal from the timepiece circuit. Therefore, the following effects can be provided.

(1) Power consumption in the standby state can be set to be almost 0 W, and since electric power can be prevented from being consumed all day long for an auto-receive function, electric power loss can be greatly reduced.

(2) Since generation of radiation noise can be prevented due to the effect (1), the adverse influences on other electronic devices can be prevented.

(3) Since the primary side of the main power supply is not directly controlled by a plurality of means, this embodiment can be easily practiced independently of limitations associated with the safety standards.

(4) A user need not be concerned with the set-up operation of the main power supply for charging the secondary battery.

(5) The secondary battery can be charged in a time zone with less power consumption amount.

(Fourth Embodiment)

Figure 22:
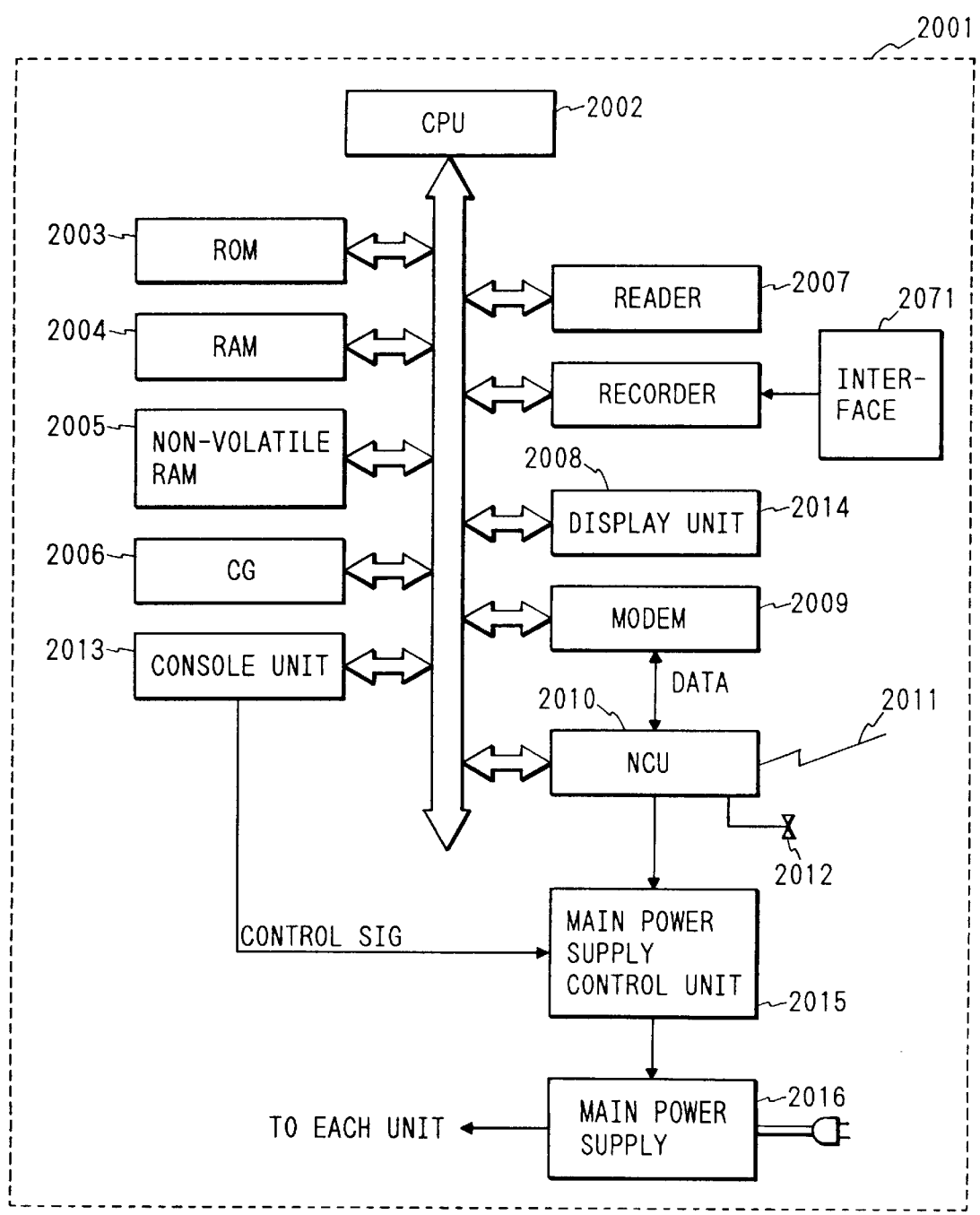
FIG. 22 is a block diagram showing the arrangement according to the fourth embodiment of the present invention.

FIG. 22 is a block diagram showing the arrangement according to the fourth embodiment. Referring to FIG. 22, an apparatus main body 2001 of this facsimile apparatus includes a CPU (central processing unit) 2002 comprising, e.g., a microprocessor. The CPU 2002 controls the system of the entire apparatus in accordance with a program stored in a ROM 2003, i.e., controls a RAM 2004 which can read/write data, a non-volatile RAM 2005, a character generator (CG) 2006, a document reader 2007, a recorder 2008, a modem 2009, a network control unit (NCU) 2010, a console unit 2013, and a display unit 2014.

The RAM 2004 stores binary image data read by the reader 2007 or binary image data to be recorded by the recorder 2008. Binary image data stored in the RAM 2004 is modulated by the modem 2009, and the modulated data is output onto a telephone line 2011 via the NCU 2010. Also, an analog waveform signal input from the telephone line 2011 is demodulated via the NCU 2010 and the modem 2009 to obtain binary image data, and the demodulated binary image data is also stored in the RAM 2004.

The non-volatile RAM 2005 reliably stores data to be preserved such as abbreviated dial number data even after the power supply of the apparatus main body 2001 is shut down. The ROM 2003 stores character data such as JIS code, ASCII codes, and the like, and outputs 2-byte character data corresponding to a predetermined code under the control of the CPU 2002.

The reader 2007 comprises a DMA controller, an image processing IC, an image sensor, a CMOS logic IC, and the like. The reader 2007 binarizes data read by utilizing a contact sensor (CS) and sequentially supplies the binary data to the RAM 2004 under the control of the CPU 2002. The set state of a document sheet on the reader 2007 can be detected by a mechanical document detect sensor arranged in a convey path of a document sheet, and a document detect signal from the sensor is input to a main power supply control unit 2015 for controlling a main power supply 2016 and to the CPU 2002.

The recorder 2008 comprises a DMA controller, an ink-jet recording device, a CMOS logic IC, and the like. The recorder reads out recording data stored in the RAM 2004 and records the readout data as a hard copy under the control of the CPU 2002. The modem 2009 comprises G3 and G2 modems, a clock generator connected to these modems, and the like. The modem 2009 modulates transmission data stored in the RAM 2004 and outputs the modulated data onto the telephone line 2011 via the NCU 2010 under the control of the CPU 2002. Also, the modem 2009 receives an analog signal on the telephone line 2011 via the NCU 2010, and stores binary data, obtained by demodulating the analog signal, in the RAM 2004.

The NCU 2010 selectively switches the telephone line 2011 to the modem 2009 or a telephone set 2012 under the control of the CPU 2002. The NCU 2010 has a detect means for detecting a ringing signal (CI). Upon detection of the ringing signal, the NCU 2010 supplies an incoming call signal to the main power supply control unit 2015 and the CPU 2002.

The telephone set 2012 is integrated with the apparatus main body 2001, and comprises a handset, a speech network, a dialer, a ten-key pad or one-touch keys, and the like. The console unit 2013 comprises a start key for starting image transmission, reception, and the like, a mode selection key for designating an operation mode such as a "fine" mode, a "standard" mode, an "auto-receive" mode, and the like in transmission/reception, a ten-key pad or one-touch keys for dialing, and the like. When one of these keys is depressed, an ON signal of the corresponding key is supplied to the main power supply control unit 2015 and the CPU 2002.

The display unit 2014 comprises a liquid crystal display for performing a 16-digit display, and displays predetermined characters and the like under the control of the CPU 2002. The main power supply control unit 2015 controls energization (power supply) to the respective units of the apparatus main body 2001, and comprises a one-chip microcomputer, a capacitor-type secondary battery, and the like. The main power supply control unit 2015 can be driven by only electric power supplied from the secondary battery. The main power supply control unit 2015 outputs a start signal to start the main power supply 2016 upon reception of a document detect signal from the reader 2007, an incoming call signal from the NCU 2010, or an ON signal from the console unit 2013. The main power supply 2016 comprises an AC-input switching power supply, and its switching operation can be externally ON/OFF-controlled. The main power supply 2016 starts or stops power supply in accordance with the start or stop signal from the main power supply control unit 2015.

An interface (Centronics I/F) 2071 is used for connecting, e.g., an external personal computer. Control signals and data signals supplied from the personal computer are supplied to the recorder 2008 via the interface 2071, and the recorder 2008 performs a print-out (recording) operation based on the input data.

Figure 23:
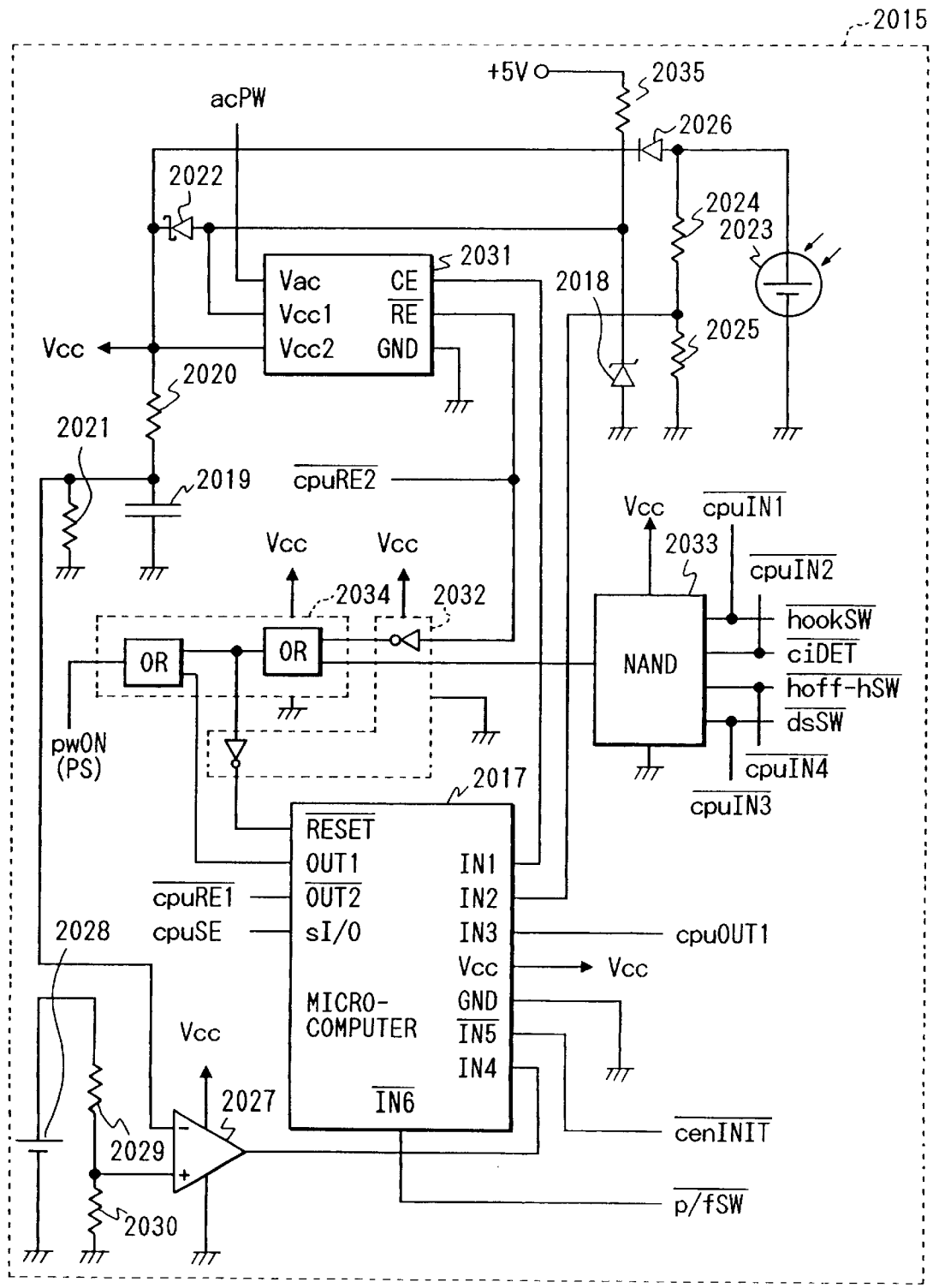
FIG. 23 is a circuit diagram showing the internal arrangement of a main power supply control unit.
Figure 24:
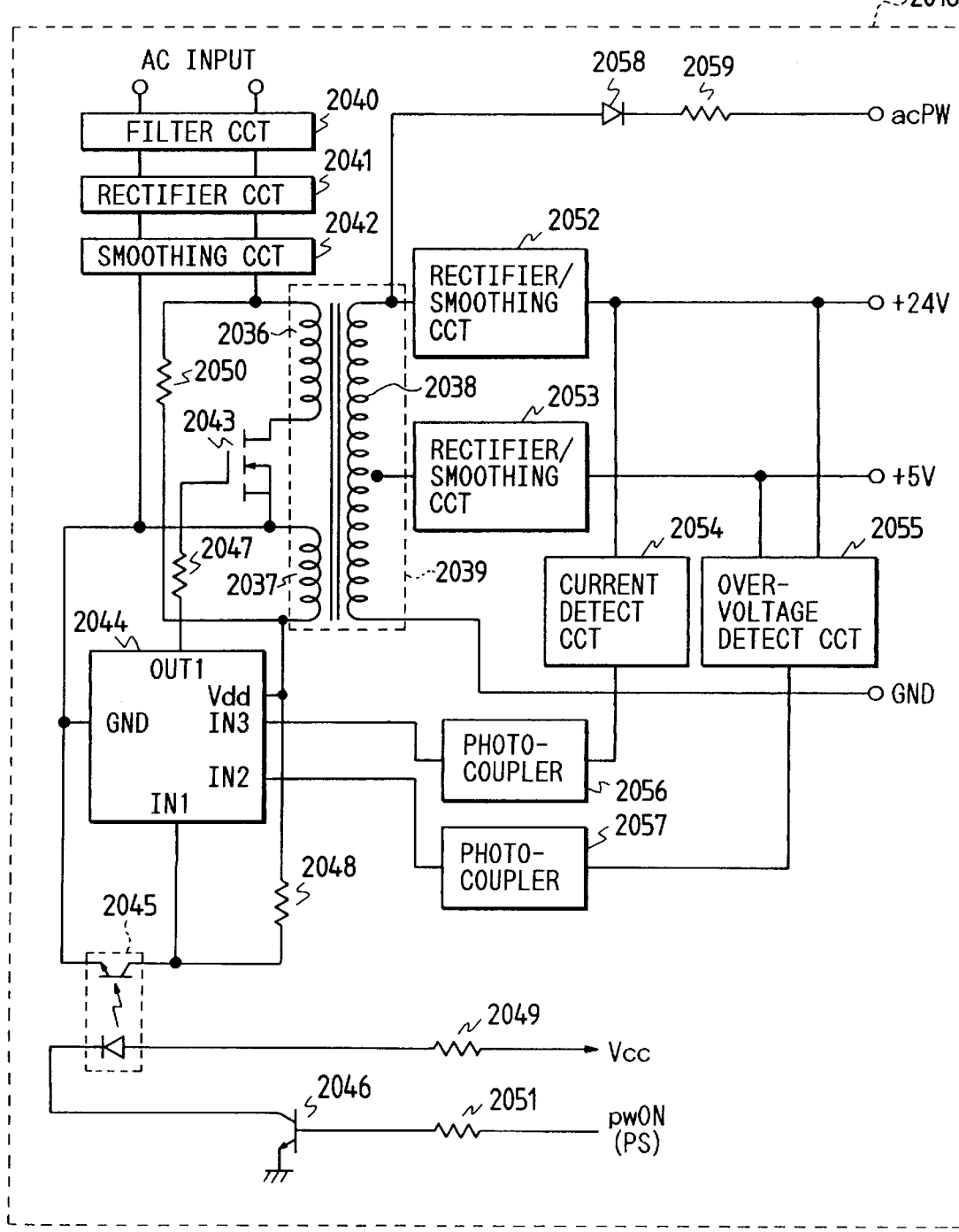
FIG. 24 is a circuit diagram showing the internal arrangement of a main power supply.
Figure 25:
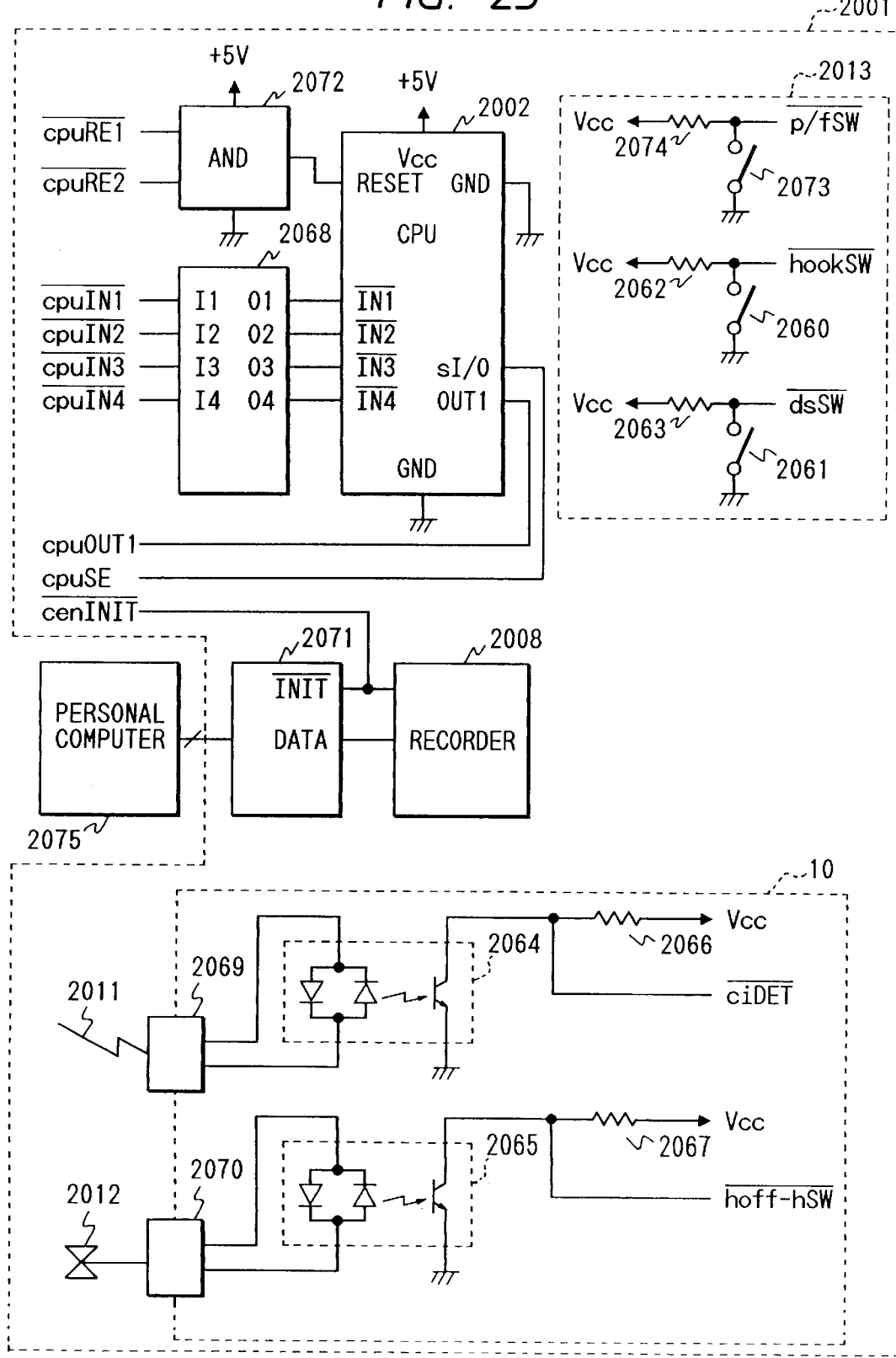
FIG. 25 is a circuit diagram showing the circuit arrangements of the respective units shown in FIG. 22.

FIG. 23 is a circuit diagram showing the internal arrangement of the main power supply control unit 2015, FIG. 24 is a circuit diagram showing the internal arrangement of the main power supply 2016, and FIG. 25 is a circuit diagram showing the circuit arrangements of various switch units and peripheral circuits of the CPU 2002 in the apparatus main body 2001.

Referring to FIGS. 23 to 25, a power supply line Vcc connects three different power supply sources, i.e., a +5 V line from the main power supply 2016, a solar cell 2023, and the above-mentioned capacitor-type secondary battery 2019. The priority levels of these three power supplies are determined by their voltages, a reverse-flow prevention Schottky barrier diode 2022, and a reverse-flow prevention diode 2026, and a voltage from the main power supply 2016 is set to be about 4.8 V by a Zener diode 2018 and the Schottky barrier diode 2022, a voltage from the solar cell 2023 is set to be 4.6 V, and a voltage from the secondary battery 2019 is set to be 4.5 V (when fully charged).

When the main power supply 2016 is set up, this power supply has the highest priority due to the directions of the diodes 2022 and 2026, and the main power supply 2016 charges the secondary battery 2019 and supplies electric power onto the line Vcc. At this time, the solar cell 2023 is set at a low potential, and does not supply any current. When the main power supply 2016 is not in operation, and the solar cell 2023 is supplying electric power, i.e., when light energy is being supplied although the main power supply 2016 is not in operation, if the potential of the secondary battery 2019 is higher than that of the solar cell 2023, electric power is supplied from the secondary battery 2019 onto the line Vcc, and is not supplied from the solar cell 2023. When the potential of the secondary battery 2019 is lower than that of the solar cell 2023, the solar cell 2023 supplies electric power onto the line Vcc, and at the same time, charges the secondary battery 2019 via a resistor 2020. When neither the main power supply 2016 nor the solar cell 2023 are in operation, the secondary battery 2019 supplies electric power onto the line Vcc.

Referring to FIG. 23, a 4-bit one-chip microcomputer 2017 can operate with ultra-low power consumption, and comprises an internal timer means. The microcomputer 2017 exchanges serial data with the CPU 2002 via an sI/O terminal. Whether or not the solar cell 2023 supplies electric power is determined by voltage-dividing the potential of the solar cell 2023 by resistors 2024 and 2025, and inputting the voltage-divided value to an input port IN2 of the microcomputer 2017. The voltage from the secondary battery 2019 is detected by comparing it with the voltage from a primary battery 2028 for backing up the RAM 2005 by a comparator 2027 via a voltage stabilization resistor 2021. The output from the comparator 2027 is supplied to an input port IN4 of the microcomputer 2017. Note that resistors 2029 and 2030 are used for voltage-dividing the voltage from a primary battery 2028.

An IC 2031 compares a voltage Vac at the secondary side of the main power supply 2016, a voltage Vcc1 of +5 V from the main power supply 2016, and a voltage Vcc2 from the secondary battery 2019. When the voltage Vcc1 becomes higher than 2 V, the CE output port of the IC 2031 goes to High level. When the voltage Vac becomes equal to or lower than about 2 V, the CE output port goes to Low level. The output from the CE output port is supplied to an input port IN1 of the microcomputer 2017. When the voltage Vcc2 becomes equal to or lower than 3 V, the RE output port of the IC 2031 goes from High level to Low level, and a reset signal is kept output. When the voltage Vcc2 becomes higher than 3 V, the RE output port is kept at High level. The output from the RE output port is supplied to the RESET port of the microcomputer 2017 via an inverter IC 2032 and an OR gate IC 2034. This output is also supplied to the RESET port of the CPU 2002 via an AND gate IC 2072 (FIG. 25).

A NAND gate IC 2033 receives a signal from a hooking switch 2060, a mechanical document detect switch (or read switch) 2061, a ringing signal detect switch (photo-coupler) 2064, or an off-hook detect switch (photo-coupler) 2065 for the handset, as shown in FIG. 25. The output from the IC 2033 is supplied to the RESET port of the microcomputer 2017 via the IC 2034. Note that voltage adjustment resistors 2062, 2063, 2066, 2067, and 2074 in FIG. 25 are respectively connected to the switches 2060, 2061, 2064, and 2065, and a switch 2073, and modular jacks 2069 and 2070 in FIG. 25 are respectively connected to the switches 2064 and 2065.

When an input port IN3 of the microcomputer 2017 is at High level, it indicates that the CPU 2002 is active. The output from an output port OUT1 of the microcomputer 2017 is supplied to the main power supply 2016 via the IC 2034. An output port OUT2 of the microcomputer 2017 outputs a reset signal to the CPU 2002 via the AND gate IC 2072. Note that a resistor 2035 is used for adjusting a voltage.

Referring to FIG. 24, an AC input is supplied to an insulating transformer 2039 having primary and secondary windings 2036 and 2038 via a filter circuit 2040, a rectifier circuit 2041, and a smoothing circuit 2042, and is switched by an FET 2043. An IC 2044 performs oscillation control at the primary side of the transformer 2039, and its power supply voltage Vdd is supplied from an auxiliary winding 2037 wound in the transformer 2039. The secondary side of the transformer 2039 supplies power supply voltages of +24 V and +5 V from the winding 2038 to the respective units in the apparatus main body 2001 via rectifier/smoothing circuits 2052 and 2053.

A current detect circuit 2054 and an overvoltage detect circuit 2055 feed back their outputs to the IC 2044 via photo-couplers 2056 and 2057, respectively. The IC 2044 performs PWM control based on a current at the secondary side, and when an overvoltage is detected, the IC 2044 shuts down the entire system.

A signal PS as a signal to be used in the fourth embodiment is supplied to the IC 2044 via a photo-coupler 2045. When the signal PS is at High level, a transistor 2046 is enabled, and a current is supplied to the photo-coupler 2045. Then, the photo-coupler 2045 performs current-voltage conversion, and the input port IN1 of the IC 2044 goes to Low level. The output port OUT1 of the IC 2044 oscillates accordingly, and the primary side of the transformer 2039 oscillates via the FET 2043 and supplies electric power to the secondary side. Thus, the main power supply 2016 is set up, and starts its operation. When the signal PS is at Low level, the transistor 2046 is disabled, and the input port IN1 of the IC 2044 goes to High level. The output port OUT1 of the IC 2044 goes to Low level accordingly, and the FET 2043 is disabled. Thus, oscillation at the primary side of the transformer 2039 is stopped, and the main power supply 2016 stops its operation. The power supply device also includes current limiting resistors 2047, 2048, 2049, 2050, and 2051, a reverse-flow prevention diode 2058, and a current limiting resistor 2059. Note that the photo-coupler 2045 also performs insulation between the primary and secondary sides.

Referring to FIG. 25, a delay circuit 2068 is constituted by a resistor and a capacitor, delays signals input to its input ports I1 to I4 by a time required for initialization of the CPU 2002, and outputs the delayed signals from output ports O1 to O4, respectively. A mode selection switch 2073 is used for switching an operation mode between a FAX mode and a printer mode. Upon operation, i.e., depression of this switch, a signal is input to an input port IN6 of the microcomputer 2017, and the microcomputer 2017 switches the operation mode between the FAX mode and the printer mode. A personal computer 2075 as the above-mentioned external terminal device is connected to the recorder 2008 via the interface 2071.

FIGS. 26 to 29B are flow charts showing the operation of this embodiment. The operation of this embodiment will be described below with reference to FIGS. 26 to 29B.

Figure 26:
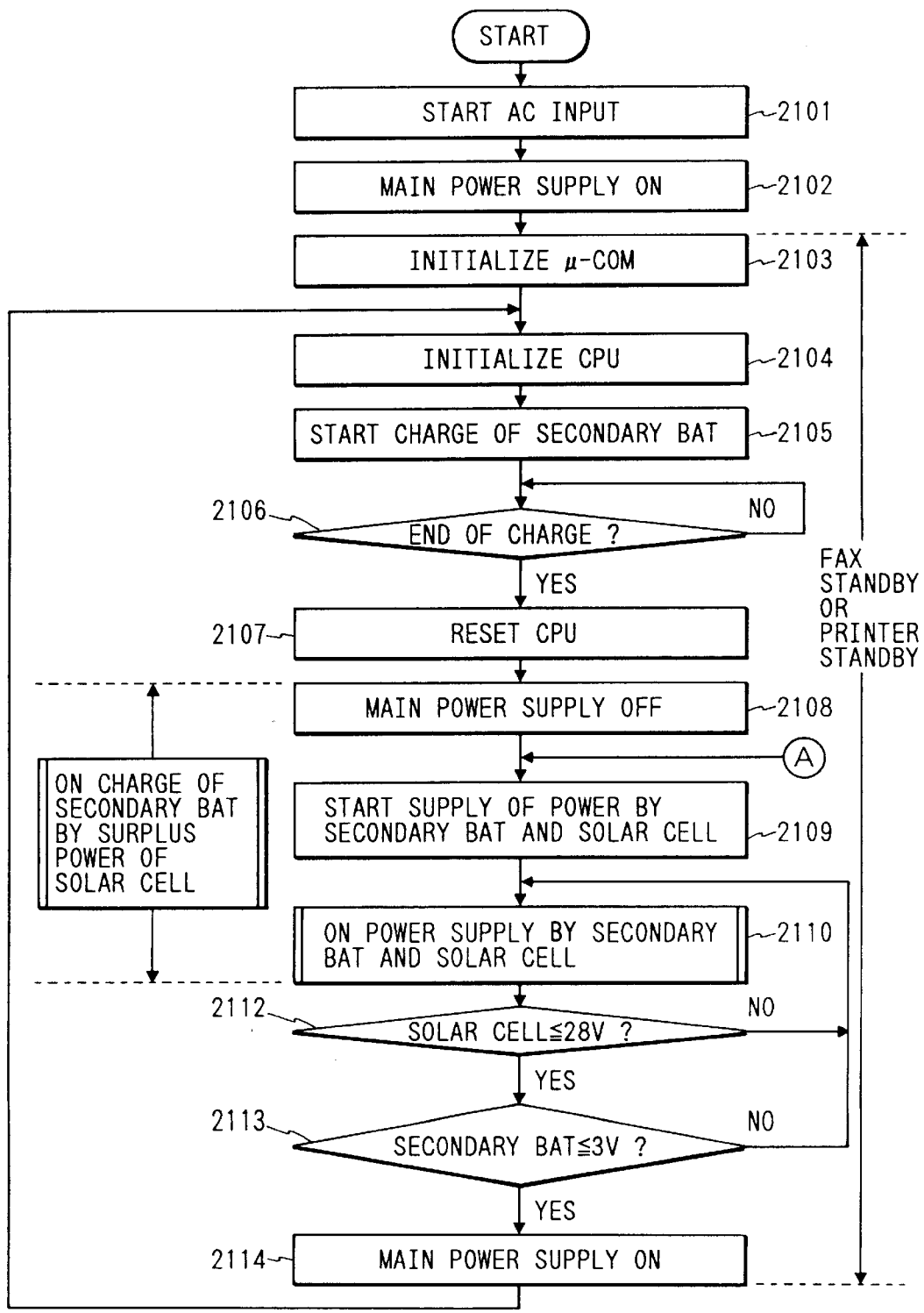
FIG. 26 is a flow chart showing the operation in a FAX standby state.

FIG. 26 is a flow chart showing the operation in a FAX standby state. When an AC input is started (step 2101), the main power supply 2016 is turned on and started (step 2102) to initialize the microcomputer 2017 (step 2103), to initialize the CPU 2002 (step 2104), and at the same time, to start charging of the secondary battery 2019 (step 2105). Upon completion of initialization of the microcomputer 2017, the facsimile apparatus is set in a FAX or printer standby state, and while this standby state continues, the secondary battery 2019 is kept charged.

Upon completion of charging of the secondary battery 2019 (step 2106), i.e., when the output from the comparator 2027 goes to High level or when the internal timer of the microcomputer 2017 has measured one hour, the main power supply 2016 stops. At this time, in the former case, since the port IN4 of the microcomputer 2017 goes to High level, the microcomputer 2017 sets the output port OUT2 at Low level accordingly to reset the CPU 2002 (step 2107), and sets the output port OUT1 at Low level to set the signal PS at Low level. Thus, the transistor 2046 is disabled, and the photo-coupler 2045 is turned off. As a result, the input port IN1 of the IC 2044 goes to High level, and the IC 2044 stops oscillation of the output port OUT1 to stop power supply to the secondary side, thereby stopping the operation of the main power supply 2016 (step 2108). Thus, power supply by only the secondary battery 2019 and the solar cell 2023 is started (step 2109).

Similarly, in the latter case, the microcomputer 2017 resets the CPU 1002 according to the contents of the internal timer (2107), and sets the output port OUT1 at Low level to set the signal PS at Low level. Thus, the transistor 2046 is disabled, and the photo-coupler 2045 is turned off. As a result, the input port IN1 of the IC 2044 goes to High level, and the IC 2044 stops oscillation of the output port OUT1 to stop power supply to the secondary side, thereby stopping the operation of the main power supply 2016 (step 2108). Then, power supply by only the secondary battery 2019 and the solar cell 2023 is started (steps 2109 and 2110). In either case, the secondary battery 2019 is charged by surplus power of electric power supplied from the solar cell 2023.

When electric power supplied from the solar cell 2023 decreases, and its voltage becomes equal to or lower than 2.8 V (step 2112), the secondary battery 2019 begins to discharge. When the voltage from the secondary battery 2019 becomes equal to or lower than 3 V (step 2113), the RE output port of the IC 2031 goes to Low level, and the above-mentioned signal PS goes to High level. Therefore, the photo-coupler 2045 is turned on, and the port IN1 of the IC 2044 goes to Low level. According to the output from the port IN1, the port OUT1 of the IC 2044 oscillates, and the primary side of the transformer 2039 oscillates via the FET 2043, thus supplying electric power to the secondary side. Thus, the main power supply 2016 is started (step 2114). During this operation, the CPU 2002 is initialized (step 2104), and charging of the secondary battery 2019 is started (step 2105). In this manner, the secondary battery 2019 is charged again while maintaining the FAX standby state. Then, this cycle is repeated.

FIG. 27 shows a FAX transmission interruption routine in the FAX standby state. When a document sheet is detected in the FAX standby state (step 2201), when a hooking button is depressed (step 2202), or when the handset is hooked off (step 2203), a corresponding one of the switches 2061, 2060, and 2065 is turned on, and its ON signal is supplied to the CPU 2002 via the delay circuit 2068. Also, the ON signal turns on the photo-coupler 2045 as the signal PS via the ICs 2033, 2032, and 2034, and resets the microcomputer 2017. Thus, this interruption operation is started (step 2204).

When the photo-coupler 2045 is turned on, the IC 2044 oscillates the primary side via the FET 2043 to supply electric power to the secondary side. Thus, the main power supply 2016 is set up and starts charging of the secondary battery (step 2205). While the main power supply 2016 is active, the secondary battery 2019 is always charged. In this state, when a call is made to a destination facsimile apparatus (step 2206), and a line is captured (step 2207), it is ready to perform normal facsimile transmission (step 2208). When transmission ends (step 2209) and the line is disconnected (step 2210), a signal to be input from the port OUT1 of the CPU 2002 to the port IN3 of the microcomputer 2017 goes from High level to low level, and the microcomputer 2017 resets the CPU 2002 accordingly and sets the output port OUT1 at Low level to set the signal PS at Low level. Thus, the transistor 2046 is disabled, and the photo-coupler 2045 is turned off. As a result, the input port IN1 of the IC 2044 goes to High level, and oscillation of the output port OUT1 of the IC 2044 is stopped to stop power supply to the secondary side, thereby stopping the operation of the main power supply 2016, and ending charging of the secondary battery (step 2212). Upon completion of this interruption (step 2213), the FAX standby state is set, and the flow returns to a connector A in FIG. 26.

FIG. 28 shows a FAX reception interruption routine in the FAX standby state. When the hooking button is depressed in the FAX standby state (step 2301), or when the handset is hooked off (step 2302), a corresponding one of the switches 2060 and 2065 is turned on, and its ON signal is input to the CPU 2002 via the delay circuit 2068. Also, the ON signal turns on the photo-coupler 2045 as the signal PS via the ICs 2033, 2032, and 2034, and resets the microcomputer 2017. Thus, this interruption operation is started (step 2304).

When the photo-coupler 2045 is turned on, the IC 2044 oscillates the primary side of the transformer 2039 via the FET 2043, thereby supplying electric power to the secondary side. Thus, the main power supply 2016 is set up, and charging of the secondary battery is also started (step 2305). On the other hand, when a ringing signal (CI) is detected (step 2303), the switch 4206 is turned on, and its ON signal is supplied to the CPU 2002 via the delay circuit 2068. Also, the ON signal similarly turns on the photo-coupler 2045 as the signal PS via the ICs 2033, 2032, and 2034, and resets the microcomputer 2017. Thus, this interruption operation is started (step 2307). When the photo-coupler 2045 is turned on, the IC 2044 oscillates the primary side of the transformer 2039 via the FET 2043, thereby supplying electric power to the secondary side. Thus, the main power supply 1016 is set up, and charging of the secondary battery is started (step 2308). In either case, while the main power supply 2016 is active, the secondary battery 2019 is always charged.

When the hooking button is depressed or when the handset is hooked off, a call is made to a destination facsimile (step 2306), and when a line is captured (step 2309), normal facsimile reception is performed (step 2310). When a ringing signal is detected, the NCU 2010 captures the line, and performs facsimile reception in an auto-receive mode.

Upon completion of reception (step 2311), when the line is disconnected (step 2312), a signal to be input from the port OUT1 of the CPU 2002 to the port IN3 of the microcomputer 2017 goes from High level to Low level. In accordance with this signal, the microcomputer 2017 resets the CPU 2002, and sets the signal PS at Low level to stop the operation of the main power supply 2016 and to end charging of the secondary battery (step 2314). Upon completion of this interruption operation (step 2315), the FAX standby state is set, and the flow returns to the connector A in FIG. 26.

Figure 29B:
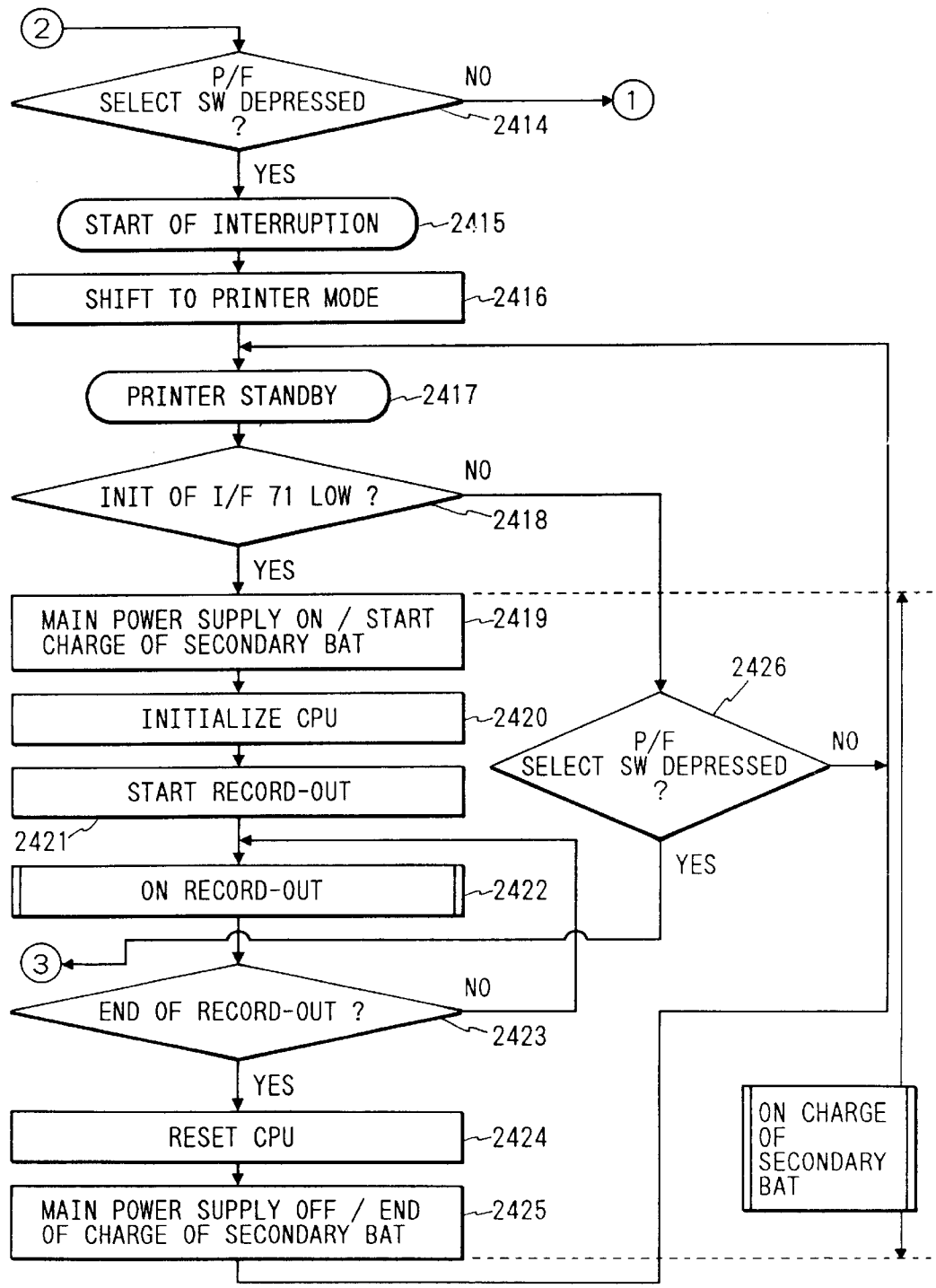
FIG. 29 is comprised of FIG. 29A and FIG. 29B showing flow charts for a printer mode interruption routine in the FAX standby state.

FIGS. 29A and 29B show interruption routine associated with the printer mode in the FAX standby state. When the personal computer 2075 is connected to the apparatus of this embodiment, and the apparatus is set in the standby state in the FAX mode, if a print command is executed by the personal computer 2075, a signal from the INT port of the interface 2071 (FIG. 25) goes from High level to Low level (step 2401), and interruption is started (step 2402). Thus, the apparatus main body 2001 is shifted to the printer mode in accordance with a command from the microcomputer 2017 (step 2403). The microcomputer 2017 sets the output port OUT1 at High level to turn on the photo-coupler 2045, and the input port IN1 of the IC 2044 goes to Low level. In accordance with the level of the input port IN1, the output port OUT1 of the IC 2044 oscillates, and the primary side of the transformer 2039 oscillates via the FET 2043, thus supplying electric power to the secondary side. As a result, the main power supply 2016 is set up, and charging of the secondary battery is started (step 2404).

When the main power supply 2016 is set up, the CPU 2002 is initialized by a signal output from the output port OUT2 of the microcomputer 2017 (step 2405). Upon completion of this initialization, the microcomputer 2017 supplies, from its sI/O port to the CPU 2002, a message indicating that the print command is input from the personal computer 2075. Thereafter, the CPU 2002 controls the recorder 2008 to record data signals sent from the personal computer 2075 (steps 2406 and 2407). Upon completion of recording (step 2408), the CPU 2002 supplies, from its sI/O port to the microcomputer 2017, a message indicating that the print operation of data sent from the personal computer 2075 has ended. The CPU 2002 is reset by a signal output from the output port OUT2 of the microcomputer 2017 (step 2409), and the microcomputer 2017 sets its output port OUT1 at Low level to set the signal PS at Low level. As a result, the photo-coupler 2045 is turned off, and the input port IN1 of the IC 2044 goes to High level. In accordance with the level of the input port IN1, the IC 2044 stops oscillation of the output port OUT1, and the primary side stops oscillation via the FET 2043, thus stopping power supply to the secondary side. Then, the main power supply 2016 stops its operation, and charging of the secondary battery ends (step 2410). The apparatus main body 2001 shifts to the FAX mode in accordance with a command from the microcomputer 2017 (step 2411), and is set in the FAX standby state (step 2412). Upon completion of this interruption (step 2413), the flow returns to the connector A in FIG. 26.

When the mode selection switch 2073 is depressed in the FAX standby state in the FAX mode (step 2414), interruption is started (step 2415), and the apparatus main body 2001 shifts to the printer mode in accordance with a command from the microcomputer 2017 (step 2416). Thus, the apparatus main body 2001 is set in the printer standby state (step 2417). When a print command is executed by the personal computer 2075 in this state, a signal from the INIT port of the interface 2071 goes from High level to Low level (step 2418), and the microcomputer 2017 sets its output port OUT1 at High level accordingly to turn on the photo-coupler 2045. As a result, the input port IN1 of the IC 2044 goes to Low level. In accordance with the level of the port IN1, the output port OUT1 of the IC 2044 oscillates, and the primary side of the transformer 2039 oscillates via the FET 2043, thus supplying electric power to the secondary side. Then, the main power supply 2016 is set up, and charging of the secondary battery 2019 is started (step 2419).

When the main power supply 2016 is set up, the CPU 2002 is initialized by a signal output from the output port OUT2 of the microcomputer 2017 (step 2420). Upon completion of initialization, the microcomputer 2017 supplies, from its sI/O port to the CPU 2002, a message indicating that the print command is input from the personal computer 2075. Thereafter, the CPU 2002 controls the recorder 2008 to perform recording in accordance with data signals sent from the personal computer 2075 (steps 2421 and 2422). Upon completion of recording (step 2423), the CPU 2002 supplies, from its sI/O port to the microcomputer 2017, a message indicating that the print operation of data sent from the personal computer 2075 has ended. The CPU 2002 is reset by a signal output from the output port OUT2 of the microcomputer 2017 (step 2424), and the microcomputer 2017 sets its output port OUT1 at Low level to turn off the photo-coupler 2045. As a result, the input port IN1 of the IC 2044 goes to High level. In accordance with the level of the port IN1, the IC 2044 stops oscillation of the output port OUT1, and the primary side of the transformer 2039 stops oscillation via the FET 2043, thus stopping power supply to the secondary side. Then, the main power supply 2016 stops its operation, and charging of the secondary battery ends (step 2425). The apparatus main body returns to the printer standby state.

When the mode selection switch 2073 is depressed in the printer standby state (step 2426), the apparatus main body 2001 shifts to the FAX mode in accordance with a command from the microcomputer 2017, and is set in the FAX standby mode. The interruption ends, and the flow returns to the connector A in FIG. 26.

In the above description, while the main power supply 2016 is active, the secondary battery 2019 is simultaneously charged.

The operations in the respective states of the apparatus of this embodiment have been described. Since the fourth embodiment comprises the main power supply control unit 2015 for controlling energization to the respective units in the apparatus main body 2001, the main power supply 2016 for supplying electric power to the main power supply control unit 2015, the secondary battery 2019, and the solar cell 2023 (if necessary) so as to control power supply operations, the power consumption in the standby state can be set to be almost 0 W, as described above.

Therefore, since electric power can be prevented from being consumed all day long for an auto-receive function, electric power loss is minimized, and generation of radiation noise can be prevented. Since the primary side of the main power supply 2016 is not directly controlled by a plurality of means, this embodiment can be easily practiced independently of limitations associated with the safety standards.

As for the printer function, since the main power supply control unit 2015 performs switching control between the FAX mode and the printer mode, the 20 operation mode can be switched even when the main power supply 2016 is not active.

Furthermore, since the interface 2071 is arranged, mode switching control can be performed in accordance with a signal from the external terminal device such as the personal computer 2075, and the recorder 2008 can record input data.

As described above, the fourth embodiment comprises the main power supply for supplying electric power to the respective units of the apparatus main body, the main power supply control unit for controlling the main power supply, the secondary battery and the solar cell for supplying electric power to the main power supply control unit, and the interface with an external terminal device, so that the main power supply can be started in response to a ringing signal from the telephone line, an ON signal from an external switch means, or a control signal from the external terminal device. Therefore, the following effects can be provided.

(1) Power consumption in the standby state can be set to be almost 0 W, and since electric power can be prevented from being consumed all day long for an auto-receive function, electric power loss can be greatly reduced.

(2) Since generation of radiation noise can be prevented due to the effect (1), the adverse influences on other electronic devices can be prevented.

(3) Since the primary side of the main power supply is not directly controlled by a plurality of means, this embodiment can be easily practiced independently of limitations associated with the safety standards.

As for the printer function as an additional function, the following effects can be provided.

(4) Since the main power supply control unit performs switching control between the FAX mode and the printer mode, the operation mode can be switched even when the main power supply is not active.

(5) Since the apparatus of the fourth embodiment comprises the recorder which receives electric power from the main power supply, the apparatus shifts from the FAX mode to the printer mode in response to a control signal input from the external terminal device via the interface, the recorder performs recording based on data sent from the external terminal device via the interface, and the apparatus shifts from the printer mode to the FAX mode upon completion of recording and is set in the standby state. For this reason, even when the apparatus is in the FAX standby state, recording can be started by only a command from the external terminal device.

(6) Since power consumption in the standby state in the printer mode is also almost 0 W, electric power can be prevented from being wasted in the printer standby state, and electric power loss can be greatly reduced.

(7) Since generation of radiation noise can be prevented due to the effect (6), the adverse influences on other electronic devices can be prevented.

What is claimed is:

1. A power supply device comprising:

a main power supply for supplying electric power to respective units of an apparatus; and control means for ON/OFF-controlling said main power supply, said control means being supplied with electric power from said main power supply, wherein when an AC input to said main power supply is started, said main power supply is in an ON state and said main power supply automatically supplies the electric power to said control means for a predetermined period of time required for initializing said control means, wherein when said control means OFF-controls said main power supply before the elapse of the predetermined period of time, said main power supply is nonetheless maintained in the ON state, but is switched to an OFF state when said control means OFF-controls said main power supply after the predetermined period of time has elapsed.

2. A device according to claim 1, further comprising a battery for supplying electric power to said control means.

3. A device according to claim 2, wherein when said main power supply is ON, said battery is charged by said main power supply, and said control means measures a charging time of said battery and turns off said main power supply when the charging time reaches a predetermined period of time.

4. A device according to claim 2, wherein said battery comprises a solar cell battery.

5. A device according to claim 2, wherein when said main power supply is ON, said battery is charged by said main power supply, and said control means monitors a voltage of said battery and turns off said main power supply in accordance with the end of charging of said battery.

6. A device according to claims 1, 2, 4, 5 or 3, wherein said power supply device is a power supply device for a communication apparatus.

7. A device according to claim 6, wherein said communication apparatus comprises an image communication apparatus.

8. A device according to claim 7, wherein said image communication apparatus comprises a facsimile apparatus.

9. A power supply device comprising:

a main power supply for supplying electric power to respective units of an apparatus; and control means for ON/OFF-controlling said main power supply; and a battery for supplying electric power to said control means, wherein said battery is charged when said main power supply is in an ON condition, and said battery is not charged when said main power supply is in an OFF condition, and when said main power supply is OFF, said control means monitors a voltage of said battery, and turns on said main power supply on the basis of the voltage of said battery so as to charge said battery, said control means receiving power from said battery.

10. A device according to claim 9, wherein said power supply device is a power supply device for a communication apparatus.

11. A device according to claim 10, wherein said communication apparatus comprises an image communication apparatus.

12. A device according to claim 11, wherein said image communication apparatus comprises a facsimile apparatus.

13. A device according to claim 9, wherein when said main power supply is ON-controlled, said control means receives power from said main power supply.

* * * * *

UNITED STATES PATENT AND TRADEMARK OFFICE
CERTIFICATE OF CORRECTION

PATENT NO. : 5,914,538
DATED : June 22, 1999
INVENTOR(S) : YUJI KUROSAWA, ET AL.

It is certified that error appears in the above-identified patent and that said Letters Patent is hereby corrected as shown below:

COLUMN 28

Line 14, "ma in" should read --main--.
    Line 19, "de scribed" should read --described--.

Signed and Sealed this

Eighteenth Day of January, 2000

Attest:

Q. TODD DICKINSON

Attesting Officer     Commissioner of Patents and Trademarks

UNITED STATES PATENT AND TRADEMARK OFFICE
CERTIFICATE OF CORRECTION

PATENT NO. : 5,914,538
DATED : June 22, 1999
INVENTOR(S) : YUJI KUROSAWA ET AL.

It is certified that error appears in the above-identified patent and that said Letters Patent is hereby corrected as shown below:

<u>ON TITLE PAGE AT [56] REFERENCES CITED, U.S. PATENT DOCUMENTS</u>

Insert --4,399,396 8/1983 Hase 307/66--.

Signed and Sealed this

Twenty-second Day of August, 2000

Attest:

Q. TODD DICKINSON

*Attesting Officer*  *Director of Patents and Trademarks*